United States Patent
Onishi et al.

(10) Patent No.: US 9,255,980 B2
(45) Date of Patent: Feb. 9, 2016

(54) OPTICAL POSITION DETECTION DEVICE AND DISPLAY SYSTEM WITH INPUT FUNCTION

(75) Inventors: Yasunori Onishi, Shiojiri (JP); Masaki Takahashi, Suwa (JP)

(73) Assignee: Seiko Epson Corporation (JP)

( * ) Notice: Subject to any disclaimer, the term of this patent is extended or adjusted under 35 U.S.C. 154(b) by 912 days.

(21) Appl. No.: 13/493,179

(22) Filed: Jun. 11, 2012

(65) Prior Publication Data

US 2013/0002535 A1   Jan. 3, 2013

(30) Foreign Application Priority Data

Jun. 30, 2011   (JP) ................. 2011-145370

(51) Int. Cl.
| | |
|---|---|
| G09G 5/00 | (2006.01) |
| G01S 1/72 | (2006.01) |
| G01S 17/00 | (2006.01) |
| G01S 17/46 | (2006.01) |
| G01S 17/87 | (2006.01) |
| G01S 7/481 | (2006.01) |
| G06F 3/041 | (2006.01) |
| G06F 3/042 | (2006.01) |

(52) U.S. Cl.
CPC .............. *G01S 1/725* (2013.01); *G01S 7/4814* (2013.01); *G01S 7/4816* (2013.01); *G01S 17/003* (2013.01); *G01S 17/46* (2013.01); *G01S 17/87* (2013.01); *G06F 3/0416* (2013.01); *G06F 3/0421* (2013.01)

(58) Field of Classification Search
CPC ........ G01S 1/725; G01S 17/003; G01S 17/46; G01S 7/4814; G01S 7/4816; G01S 17/87; G06F 3/0421; G06F 3/0416
USPC .......................................................... 345/156
See application file for complete search history.

(56) References Cited

U.S. PATENT DOCUMENTS

| | | |
|---|---|---|
| 6,953,926 B2 | 10/2005 | Reime |
| 2011/0063253 A1 | 3/2011 | Kiyose |
| 2011/0096032 A1 | 4/2011 | Nakanishi |
| 2011/0304591 A1 | 12/2011 | Takahashi et al. |

FOREIGN PATENT DOCUMENTS

| | | |
|---|---|---|
| JP | 08-122070 | 5/1996 |
| JP | 2003-534554 | 11/2003 |
| JP | 2009-295318 | 12/2009 |
| JP | 2010-127671 | 6/2010 |
| JP | 2011-065409 | 3/2011 |
| JP | 2011-090605 A | 5/2011 |
| JP | 2011-122866 A | 6/2011 |
| JP | 2011-123584 | 6/2011 |
| JP | 2011-215098 | 10/2011 |
| JP | 2011-257335 | 12/2011 |

*Primary Examiner* — Gustavo Polo
(74) *Attorney, Agent, or Firm* — Harness, Dickey & Pierce, P.L.C.

(57) ABSTRACT

In an optical position detection device, when emitting the detection light from the light source section, the light receiving section receives the reflected light from the target object with the first light receiving element and the second light receiving element. The first light receiving element and the second light receiving element are arranged to have the intersection angle greater than 90° and smaller than 180°, the intersection angle being formed between the normal direction with respect to the light receiving surface of the first light receiving element and the normal direction with respect to the light receiving surface of the second light receiving element.

14 Claims, 17 Drawing Sheets

OPTICAL POSITION DETECTION DEVICE AND DISPLAY SYSTEM WITH INPUT FUNCTION

BACKGROUND

1. Technical Field

The present invention relates to an optical position detection device for optically detecting the position of a target object, and a display system with an input function provided with the optical position detection device.

2. Related Art

As the optical position detection device for optically detecting the position of the target object, there is proposed a device having a plurality of point light sources disposed at respective positions distant from each other, in which detection lights reflected by the target object are transmitted through a light transmissive member and then detected by a light receiving section when emitting the detection lights respectively from the plurality of point light sources toward the target object via the light transmissive member (see, e.g., JP-T-2003-534554). Further, there are also proposed optical position detection devices using a method of emitting the detection lights, which are emitted respectively from a plurality of point light sources, via a light guide plate, and then detecting the detection lights reflected by the target object with a light receiving section (see, e.g., JP-A-2010-127671 (Document 2) and JP-A-2009-295318 (Document 3)).

In such optical position detection devices, one light receiving element is used as the light receiving section, and the position of the target object is detected based on the result of the comparison between an output from the light receiving element when lighting some of a plurality of point light sources and an output from the light receiving element when lighting some other of the plurality of point light sources.

However, since the optical position detection device described in Document 1 uses the detection lights emitted from the point light sources, the irradiation range itself of the detection light is narrow. Therefore, there is a problem that the range in which the position of the target object can be detected is narrow. Further, since the optical position detection devices described in Document 2 and 3 each form a light intensity distribution using the light guide plate, the range in which the detection is possible is limited by the size of the light guide plate. Therefore, there is a problem that the range in which the position of the target object can be detected is narrow.

Therefore, the inventors of the invention have studied a method of detecting the position of the target object on a virtual plane using the detection light emitted from a light source device along the virtual plane. For example, as in an optical position detection device shown in FIG. 16, the detection light L2 is emitted from the light source section 12 along an X-Y plane, and at the same time, the emission intensity of the detection light L2 is reduced in a direction from one side toward the other side of a space (a detection space 10R) in which the detection light L2 is emitted as indicated by the diameter of the circular arc L21 in a first lighting operation in a first period. Further, in a second lighting operation in a second period not overlapping the first period, the emission intensity of the detection light L2 is reduced in the direction from the other side toward the one side as indicated by the diameter of the circular arc L22. Then, the position of the target object Ob is detected based on the result of the comparison between the result of receiving the detection light (reflected light L3), which is reflected by the target object Ob in the first period, by the light receiving element 130 and the result of receiving the detection light (the reflected light L3), which is reflected by the target object Ob in the second period, by the light receiving element 130. According to such a configuration, since the detection light L2 is emitted along a coordinate plane (the virtual plane) for detecting the target object Ob, there is an advantage that the detection space 10R is large.

However, in either of the configuration explained with reference to FIG. 16 and the configurations described in Documents 1 through 3, there is a problem that the detection error due to the directivity in sensitivity of the light receiving element 130 occurs. Further, since a part of the detection light L2 reflected by an object other than the target object Ob enters the light receiving element 130 when emitting the detection light L2, if the target object Ob is located in the direction tilted at a large angle with the normal direction of a light receiving surface 130a, there is also a problem that the proportion of the output component due to the detection light L2, which is reflected by the object other than the target object Ob and then enters the light receiving element 130, increases to thereby degrade the detection accuracy.

Specifically, as shown in FIG. 17A, the light receiving element 130 is provided with an element main body 130b having a rectangular solid shape as a whole, and terminals 130c projecting from both ends of the element main body 130b, and the element main body 130b is provided with the light receiving surface 130a on one surface side. The light receiving sensitivity of such a light receiving element 130 has an incident angle dependency (the directivity in sensitivity) shown in FIG. 17B, and has a sensitivity peak direction in the normal direction with respect to the light receiving surface 130a. Further, as is understood from FIG. 17B, the sensitivity of the light receiving element 130 is degraded to be less than a half of the sensitivity peak value if the incident angle of the detection light is tilted equal to or greater than 60° from the normal direction with respect to the light receiving surface 130a, and if the incident angle of the detection light is tilted equal to or greater than 90° from normal direction with respect to the light receiving surface 130a, the sensitivity becomes 0. Therefore, if the incident angle of the detection light is significantly tilted with respect to the normal direction to the light receiving surface 130a, the level of the signal output from the light receiving element 130 is lowered, and thus the detection accuracy is degraded.

Specifically, when performing the first lighting operation and the second lighting operation while varying the angular position of the target object Ob, the output signal from the light receiving section 13 results in what is shown in FIG. 18A. In FIG. 18A, the lateral axis represents the angular position of the target object Ob assuming that the direction corresponding to the one side (the other side X2 in the X-axis direction) in the emission space of the detection light L2 is 0°. Further, in FIG. 18A, the value indicated by the line V181 represents the output signal from the light receiving element 130 in the first lighting operation, the value indicated by the line V182 represents the output signal from the light receiving element 130 in the second lighting operation, and the value indicated by the line V183 corresponds to the difference between the output signal from the light receiving element 130 in the first lighting operation and the output signal from the light receiving element 130 in the second lighting operation. In such a result, although the difference represented by the line V183 should monotonically vary as the angular position of the target object Ob moves, in fact, in the case in which the reflected light L3 enters the light receiving surface 130a of the light receiving element 130 in the direction significantly tilted from the normal direction, the level of the output signal from the light receiving element 130 is extremely low, and at the same time, the difference becomes to fail to show the monotonic variation.

It should be noted that by multiplying the result shown in FIG. 18A by the sensitivity shown in FIG. 17B, the result shown in FIG. 18A is converted into the result shown in FIG. 18B. In FIG. 18B, the value indicated by the line V186 represents the result of the multiplication of the output signal from the light receiving element 130 in the first lighting operation and the sensitivity, the value indicated by the line V187 represents the result of the multiplication of the output signal from the light receiving element 130 in the second lighting operation and the sensitivity, and the value indicated by the line V188 corresponds to the difference from the output signal after the conversion. As shown in FIG. 18B, by performing the conversion using the sensitivity, the level of the output signal from the light receiving element 130 is set to be sufficiently high and the difference shows the monotonic variation in a large angular range even in the case in which the reflected light L3 enters the light receiving surface 130a of the light receiving element 130 in the direction significantly tilted from the normal direction. Therefore, it can be said that the abnormal variation shown in FIG. 18A is caused by the directivity in sensitivity of the light receiving element 130, and the incident light intensity itself to the light receiving element 130 is appropriate irrespective of the incident angle.

Therefore, although it results that it is sufficient to arrange the light receiving element 130 so as to surround the detection space 10R in order for solving the problem caused by the directivity in sensitivity of the light receiving element 130, such a configuration makes the device grow in size, and is therefore difficult to be put into practice.

SUMMARY

An advantage of some aspects of the invention is to provide an optical position detection device capable of accurately detecting the position of the target object without making the device grow in size even in the case of expanding the detection space, and a display system with an input function equipped with the optical position detection device.

An aspect of the invention is directed to an optical position detection device including a light source device adapted to emit detection light, and to vary emission intensity of the detection light from one side of a space where the detection light is emitted toward the other side when emitting the detection light, a light receiving section adapted to receive the detection light reflected in the space, and a position detection section adapted to detect a position of a target object in the space based on a detecting signal output from the light receiving section, wherein the light receiving section includes a first light receiving element having a light receiving surface pointed at the one side of the space and a second light receiving element having a light receiving surface pointed at the other side of the space at a position adjacent to the first light receiving element, and an intersection angle between a normal direction with respect to the light receiving surface of the first light receiving element and a normal direction with respect to the light receiving surface of the second light receiving element is larger than 90° and smaller than 180°.

According to the aspect of the invention, the light receiving section detects the detection light (the reflected light) reflected in the space where the detection light is emitted using the first light receiving element and the second light receiving element. Here, the first light receiving element and the second light receiving element are arranged to have the intersection angle greater than 90° and smaller than 180°, the intersection angle being formed between the normal direction with respect to the light receiving surface of the first light receiving element and the normal direction with respect to the light receiving surface of the second light receiving element. Therefore, even in the case in which the first light receiving element and the second light receiving element are arranged at positions adjacent to each other to thereby achieve downsizing of the device, even if the detection light enters one of the first light receiving element and the second light receiving element in the direction in which the light reception sensitivity is degraded, the other of the light receiving elements can receive the detection light with high sensitivity. Therefore, even in the case of expanding the detection space, the position of the target object can be detected with accuracy without making the device grow in size.

In the aspect of the invention, it is preferable that the intersection angle is larger than 120° and smaller than 140°. According to this configuration, since the detection light always enters at least either one of the first light receiving element and the second light receiving element from the direction with high sensitivity, the position of the target object can accurately be detected.

In the aspect of the invention, it is preferable that the light source device reduces the emission intensity from the one side of the space toward the other side in a first period, and reduces the emission intensity from the other side of the space toward the one side in a second period having no overlap with the first period, and the position detection section detects the position of the target object based on a drive current value in the light source device when a level of the detecting signal in the first period and a level of the detecting signal in the second period become equal to each other.

In the aspect of the invention, it is preferable that the position detection section varies the drive current value in the first period and the drive current value in the second period based on a result of comparison between a level of the detecting signal in the first period and a level of the detecting signal in the second period when the light source device emits the detection light using a reference drive current value in the first period and the second period, and when the level of the detecting signal in the first period and the level of the detecting signal in the second period become equal to each other, the position of the target object is detected based on a comparison result between an adjustment amount of the drive current value in the first period from the reference drive current value and an adjustment amount of the drive current value in the second period from the reference drive current value. According to this configuration, even in the case in which an object other than the target object exists in the space where the detection light is emitted, the influence of the object can be reduced.

In the aspect of the invention, it is possible to adopt the configuration in which the first light receiving element and the second light receiving element simultaneously detect the detection light reflected in the space.

In the aspect of the invention, it is also possible to adopt the configuration in which the first light receiving element and the second light receiving element detect the detection light reflected in the space in respective periods different from each other.

In this case, it is preferable that the light source device sets the reference drive current value in the first period to be lower than the reference drive current value in the second period in a period in which the first light receiving element performs the detection, and sets the reference drive current value in the second period to be lower than the reference drive current value in the first period in a period in which the second light receiving element performs the detection. According to such a configuration, even in the case in which the reflected light in the object other than the target object enters the light receiving section, the influence of such reflected light can be reduced.

In the aspect of the invention, it is preferable that the light source device includes a first light source adapted to emit the detection light in the first period, a first amplification section adapted to amplify a current to be supplied to the first light source, a second light source adapted to emit the detection light in the second period, and a second amplification section adapted to amplify a current to be supplied to the second light source. According to such a configuration, it is possible to respectively drive the first light source for emitting the detection light in the first period and the second light source for emitting the detection light in the second period with appropriate drive current values.

The optical position detection device according to the aspect of the invention can be used for constituting a display system with an input function having a display device provided with a display surface on which an image is displayed, and in such a case, the display device switches the image based on the position of the target object in a direction along the display surface detected by the optical position detection device. According to the display system with an input function having such a configuration, since the detection space of the optical position detection device can widely be provided, it is possible to perform an operation of, for example, switching the image by pointing the image displayed throughout a wide range with the target object.

Further, the optical position detection device according to the aspect of the invention can be used for constituting a display system with an input function having an image projection device for projecting the image, and in such a case, the image projection device switches the image based on the position of the target object in a direction traversing a projection direction of the image detected by the optical position detection device. According to the display system with an input function having such a configuration, since the detection space of the optical position detection device can widely be provided, it is possible to perform an operation of, for example, switching the image by pointing the projection image displayed throughout a wide range with the target object.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 16:
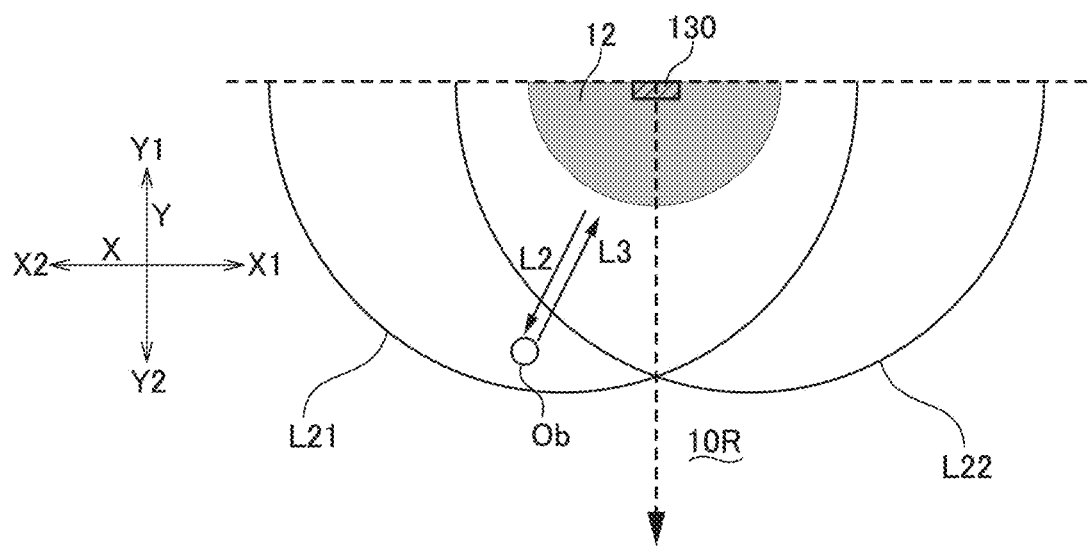
FIG. 16 is an explanatory diagram of an optical position detection device according to a reference example of the invention.
Figure 17A:
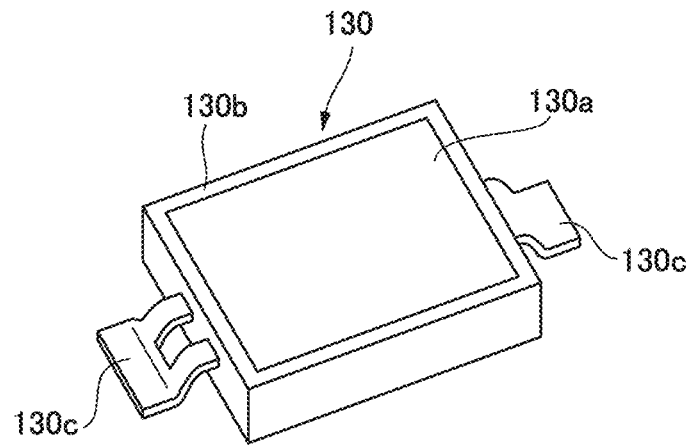
FIGS. 17A and 17B are explanatory diagrams of a light receiving element used in an optical position detection device.
Figure 17B:
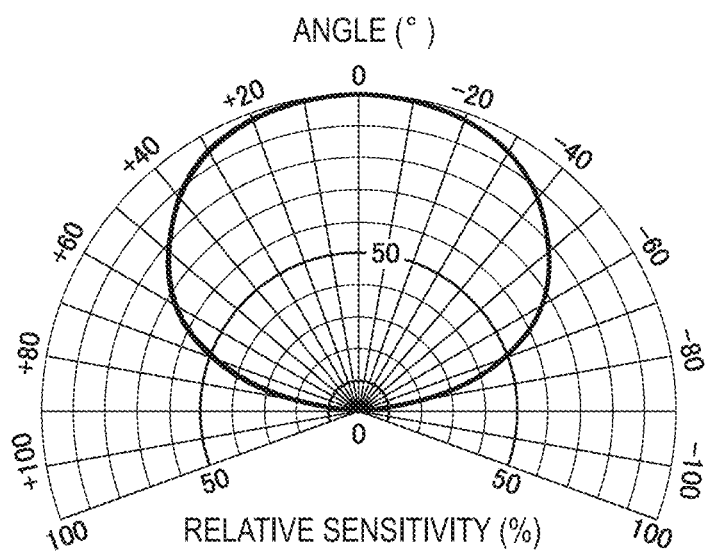

Hereinafter, some embodiments of the invention will be described in detail with reference to the accompanying drawings. It should be noted that in the following explanation directions intersecting with each other are defined as an X-axis direction and a Y-axis direction, and a direction intersecting the X-axis direction and the Y-axis direction is defined as a Z-axis direction. Further, in the drawings referred to below, things are shown assuming one side of the X-axis direction as an X1 side, the other side thereof as an X2 side, one side of the Y-axis direction as a Y1 side, the other side thereof as a Y2 side, one side of the Z-axis direction as a Z1 side, and the other side thereof as a Z2 side. Further, in the explanation below, for the sake of easy understanding of the correspondence to the constituents explained with reference to FIGS. 16, 17A, and 17B, the parts corresponding thereto are denoted with the same reference symbols.

First Embodiment

Overall Configuration

Figure 1A:
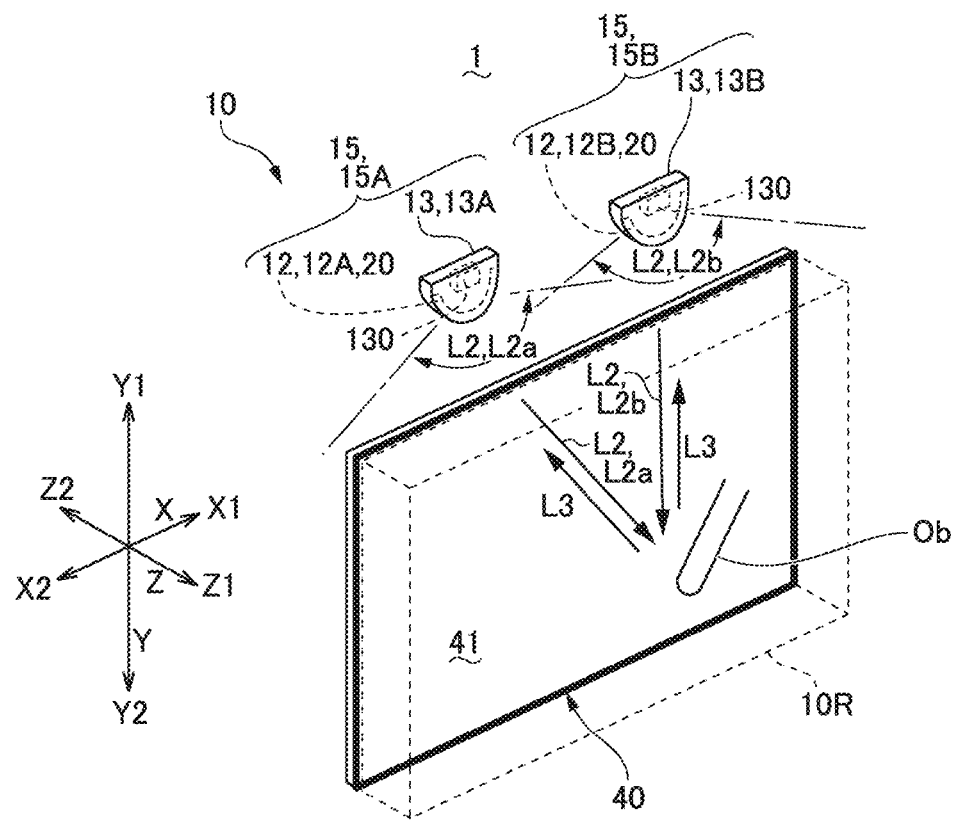
FIGS. 1A and 1B are explanatory diagrams of a substantial part of an optical position detection device according to a first embodiment of the invention.
Figure 1B:
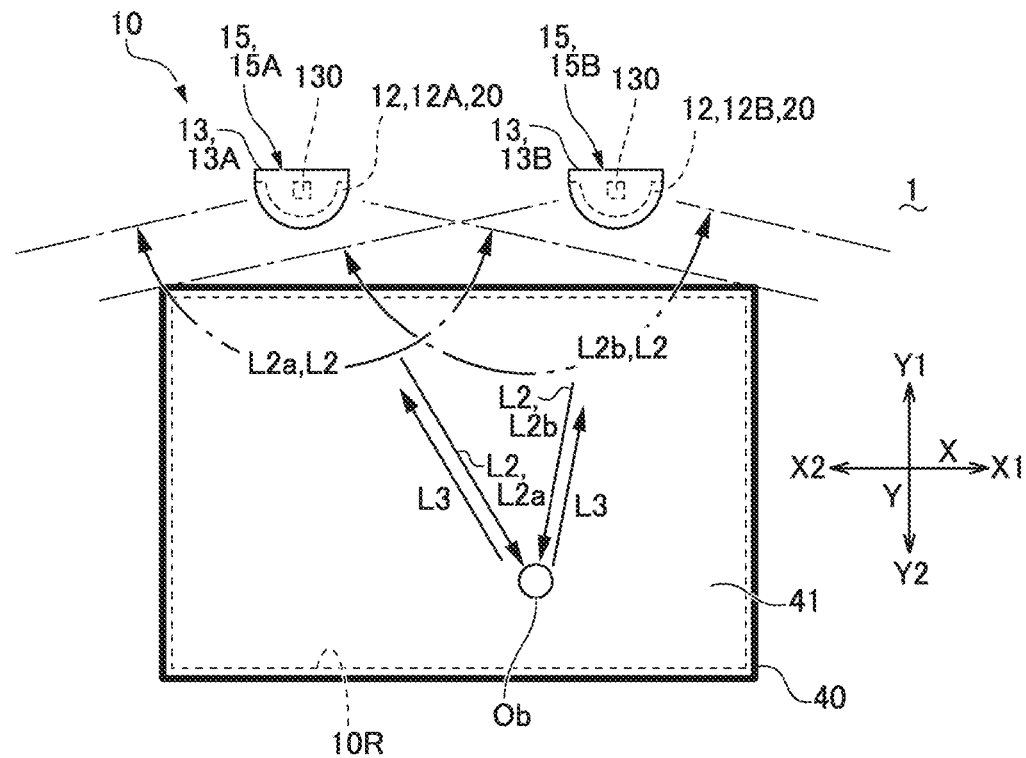

FIGS. 1A and 1B are explanatory diagrams of a substantial part of an optical position detection device according to a first embodiment of the invention. FIG. 1A is an explanatory diagram of the optical position detection device viewed in an oblique direction from the detection light emission space side, and FIG. 1B is an explanatory diagram of the optical position detection device viewed from the front thereof.

The position detection system 1 according to the present embodiment has an optical position detection device 10 for detecting the position of the target object Ob. The optical position detection device 10 detects the position of the target object Ob using detection light L2 emitted radially along an imaginary X-Y plane (an imaginary plane) defined by the X-axis direction and the Y-axis direction. In the present embodiment, the position detection system 1 has a visual plane forming member 40 having a visual plane 41 extending along the X-Y plane disposed on the one side Z1 of the Z-axis direction, and the optical position detection device 10 emits the detection light L2 along the visual plane 41 and then detects the position of the target object Ob located on the visual plane 41 side (on the one side Z1 of the Z-axis direction) with respect to the visual plane forming member 40. Therefore, the detection space 10R of the position detection system 1 is a detection light emission space where the detection light L2 is emitted in the optical position detection device 10, and a light intensity distribution of the detection light L2 described later is formed in the detection space 10R. Such a position detection system 1 can be used as a display system with an input function such as an electronic blackboard, a projection display system with an input function, and so on due to the optical position detection device 10.

In the position detection system 1 according to the present embodiment, the optical position detection device 10 is provided with a light source section 12 capable of emitting the detection light L2 radially along the visual plane 41 (the X-Y plane) and a light receiving section 13 for receiving the detection light L2 (the reflected light L3) reflected by the target object Ob located in the emission range (the detection space 10R) of the detection light L2. Here, the light source section 12 constitutes a light source device 20 together with a light source drive section 51 and an amplification section 79 to be explained with reference to FIGS. 6A and 6B.

The optical position detection device 10 is provided with two light source sections 12 (a first light source section 12A and a second light source section 12B), which are disposed at the positions distant from the visual plane forming member 40 on the one side Y1 of the Y-axis direction and facing to the detection space 10R, as the light source section 12, and the first light source section 12A and the second light source section 12B are distant from each other in the X-axis direction and are located at the same position in the Y-axis direction. Further, the optical position detection device 10 is provided with a first light receiving section 13A and a second light receiving section 13B, which are disposed at the positions distant from the visual plane forming member 40 on the one side Y1 of the Y-axis direction and facing to the detection space 10R, as the light receiving section 13, and the first light receiving section 13A and the second light receiving section 13B are distant from each other in the X-axis direction and are located at the same position in the Y-axis direction.

Here, the first light receiving section 13A is disposed at the radiation center position of the detection light L2 (the detection light L2a) emitted radially from the first light source section 12A, and the first light receiving section 13A and the first light source section 12A are integrated as a light emitting/receiving unit 15 (a first light emitting/receiving unit 15A). Further, the second light receiving section 13B is disposed at the radiation center position of the detection light L2 (the detection light L2b) emitted radially from the second light source section 12B, and the second light receiving section 13B and the second light source section 12B are integrated as the light emitting/receiving unit 15 (a second light emitting/receiving unit 15B).

The first light emitting/receiving unit 15A and the second light emitting/receiving unit 15B are located at positions projected from the visual plane forming member 40 on the one side Z1 of the Z-axis direction. Further, the first light emitting/receiving unit 15A and the second light emitting/receiving unit 15B operate in respective periods different from each other. Therefore, in the first light emitting/receiving unit 15A, when the detection light L2a is emitted from the first light source section 12A, the first light receiving section 13A receives the detection light L2a (the reflected light L3) reflected by the target object Ob located at the detection space 10R. In a different period from such an operation, in the second light emitting/receiving unit 15B, when the detection light L2b is emitted from the second light source section 12B, the second light receiving section 13B receives the detection light L2b (the reflected light L3) reflected by the target object Ob located at the detection space 10R.

Light Emitting/Receiving Unit

Figure 2:
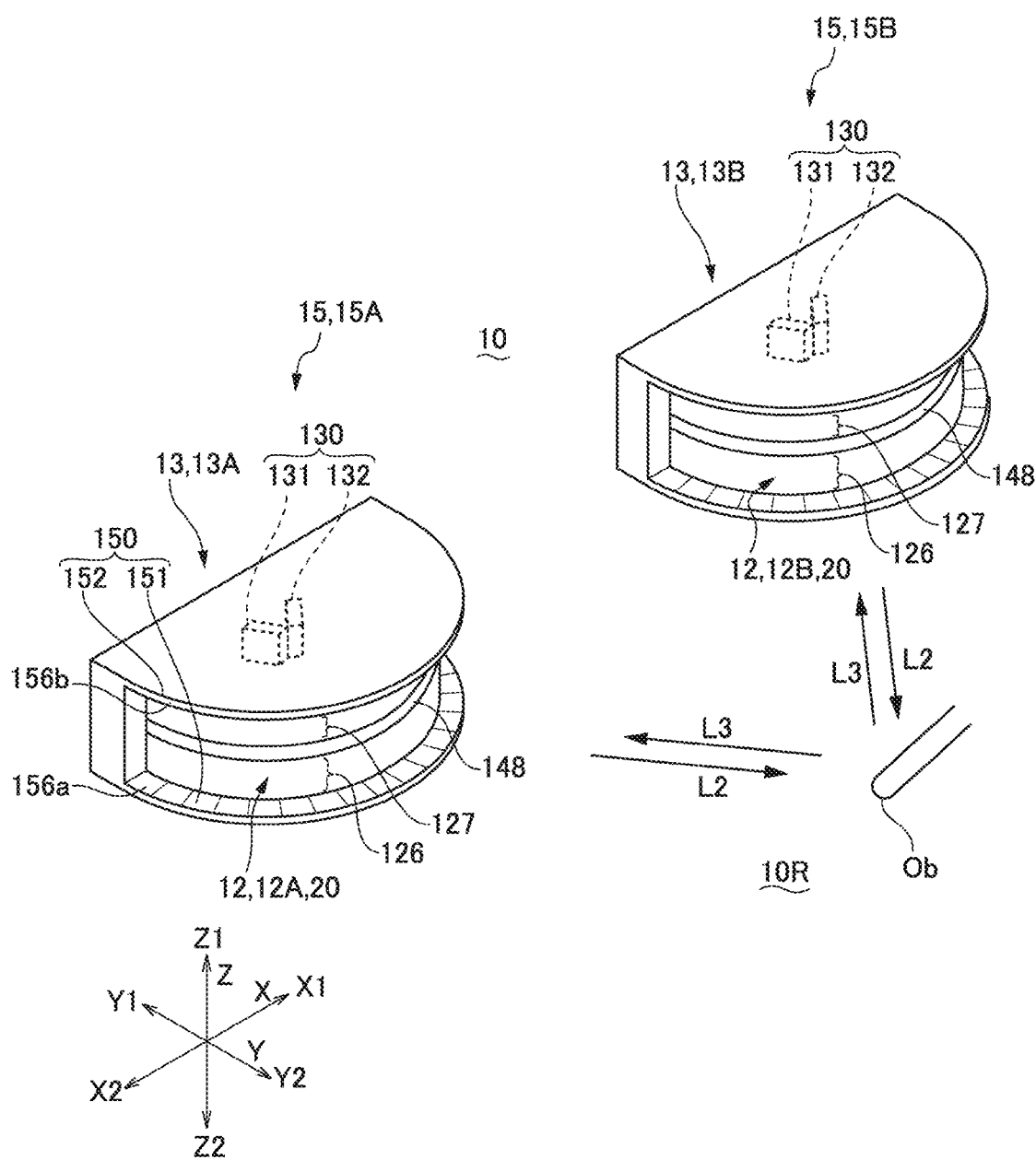
FIG. 2 is a perspective view of a light emitting/receiving unit of the optical position detection device according to the first embodiment of the invention.
Figure 3:
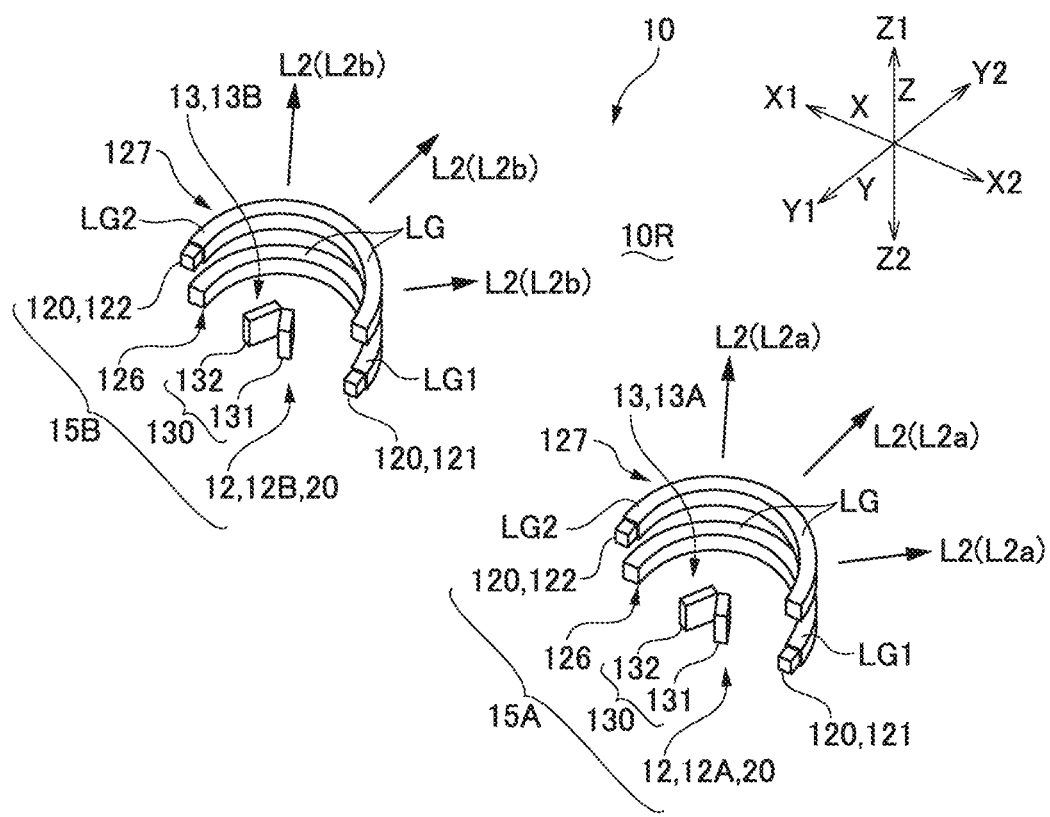
FIG. 3 is an explanatory diagram showing a configuration of a principal part of the light emitting/receiving unit of the optical position detection device according to the first embodiment of the invention.
Figure 4A:
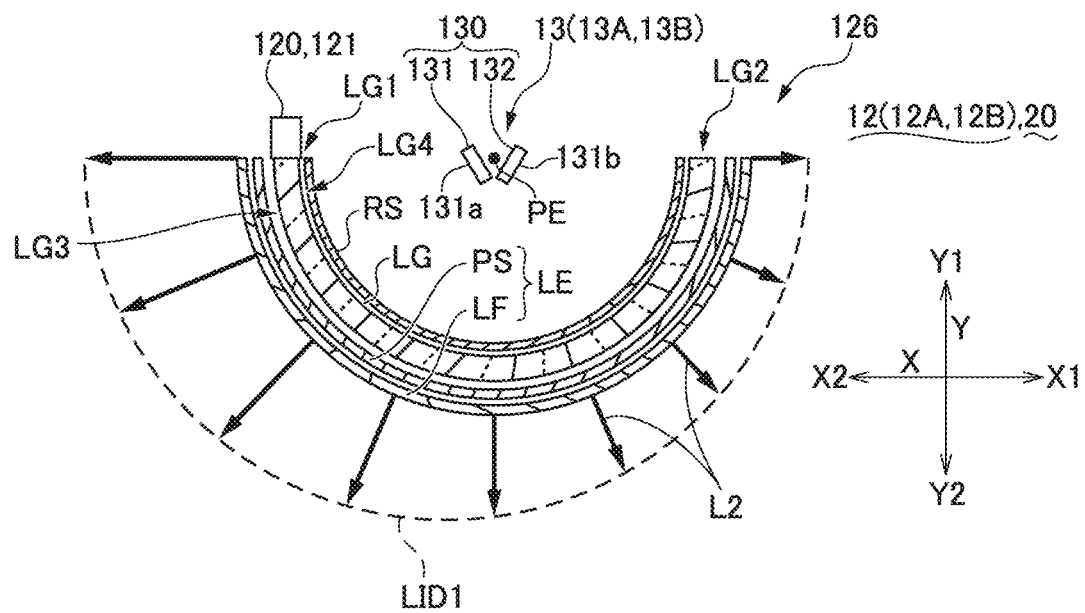
FIGS. 4A and 4B are explanatory diagrams of detection light emitted from the light emitting/receiving unit of the optical position detection device according to the first embodiment of the invention.
Figure 4B:
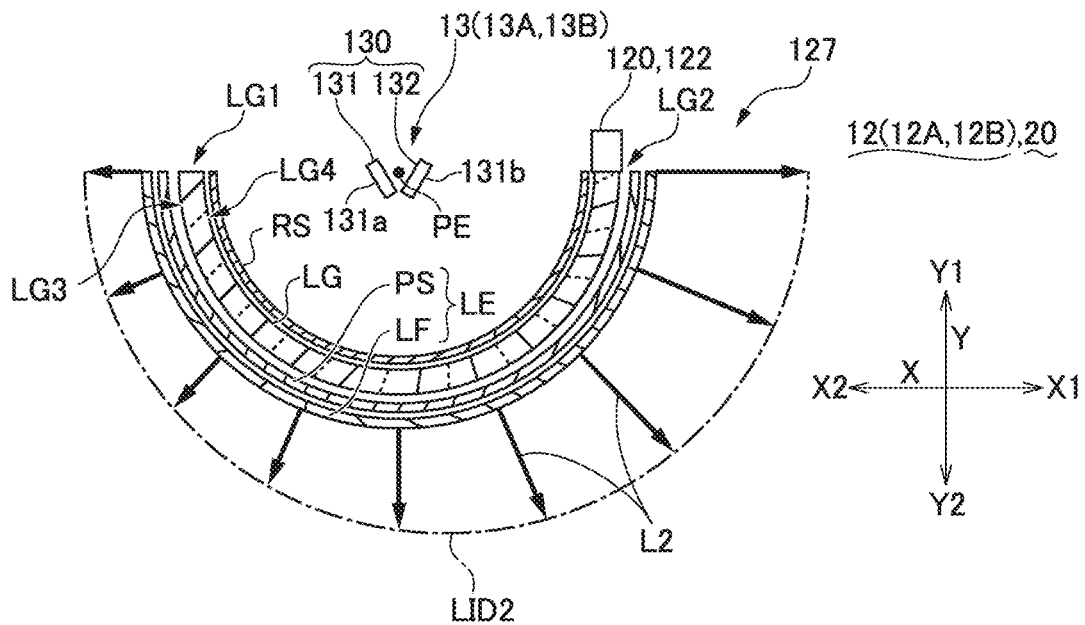

FIG. 2 is a perspective view of the light emitting/receiving unit 15 of the optical position detection device 10 according to the first embodiment of the invention. FIG. 3 is an explanatory diagram showing a configuration of a principal part of the light emitting/receiving unit 15 of the optical position detection device 10 according to the first embodiment of the invention. FIGS. 4A and 4B are explanatory diagrams of the detection light L2 emitted from the light emitting/receiving unit 15 of the optical position detection device 10 according to the first embodiment of the invention, wherein FIG. 4A shows how the detection light L2 is emitted in the first lighting operation in the first period, and FIG. 4B shows how the detection light L2 is emitted in the second lighting operation in the second period. It should be noted that since the first light emitting/receiving unit 15A and the second light emitting/receiving unit 15B have the same configurations in the optical position detection device 10 according to the present embodiment as shown in FIGS. 2 and 3, the explanation will be presented being focused on the configuration of the first light emitting/receiving unit 15A, and the detailed explanation on the second light emitting/receiving unit 15B will be omitted.

As shown in FIG. 2, the first light source section 12A is provided with a holder 150 having a fan-like shape having a peripheral surface extending with a curved shape in the longitudinal direction (the circumferential direction). The holder 150 has a structure having a first holder 151 and a second holder 152 stacked in the Z-axis direction, the first holder 151 is provided with a brim section 156a having a fan-like shape disposed on the lower end side, and the second holder section 152 is provided with a brim section 156b having a fan-like shape disposed on the upper end side. The part sandwiched between the brim sections 156a, 156b is formed as the emission section from which the detection light L2 is emitted, and the brim sections 156a, 156b limit the emission range of the detection light L2 in the Z-axis direction.

The first light source section 12A is provided with a first light source module 126 and a second light source module 127 disposed so as to be stacked in the Z-axis direction as the emission section of the detection light L2. In the first light source section 12A, the part sandwiched in the Z-axis direction between the first light source module 126 and the second light source module 127 is formed as an entrance section 148 for the reflected light L3 from the target object Ob, and the first light receiving section 13A is disposed at the back of the entrance section 148.

As shown in FIGS. 3, 4A, and 4B, in the first light emitting/receiving unit 15A, each of the first light source module 126 and the second light source module 127 is provided with a light source 120 formed of a light emitting element such as a light emitting diode and a light guide LG having a circular arc shape. Also in the second light emitting/receiving unit 15B, similarly to the first light emitting/receiving unit 15A, each of the first light source module 126 and the second light source module 127 is provided with a light source 120 formed of a light emitting element such as a light emitting diode and a light guide LG having a circular arc shape.

The first light source module 126 is provided with a first light source 121 as the light source 120. The first light source 121 is disposed with the emission direction pointed at an end surface of one end portion LG1 of the light guide LG. Further, the first light source module 126 is provided with an emission direction setting section LE having a circular arc shape, which has an optical sheet PS, a louver film LF, and so on, along the outer peripheral surface LG3 having a circular arc shape of the light guide LG, and is provided with a reflecting sheet RS having a circular arc shape along the inner peripheral surface LG4 having a circular arc shape of the light guide LG. The second light source module 127 is also provided with a second light source 122 as the light source 120 similarly to the first light source module 126. The second light source 122 is disposed with the emission direction pointed at an end surface of the other end portion LG2 of the light guide LG. Further, similarly to the first light source module 126, the second light source module 127 is provided with the emission direction setting section LE having a circular arc shape, which has the optical sheet PS, the louver film LF, and so on, along the outer peripheral surface LG3 having a circular arc shape of the light guide LG, and is provided with the reflecting sheet RS having a circular arc shape along the inner peripheral surface LG4 having a circular arc shape of the light guide LG. As the first light source 121 and the second light source 122, there are used light emitting elements such as light emitting diodes (LED). The LED emits the detection light L2 of an infrared light having a peak wavelength existing in a range of 840 through 1000 nm as a diverging light. It should be noted that a treatment for controlling the emission efficiency of the detection light L2 from the light guide LG is provided to at least either one of the outer peripheral surface LG3 and the inner peripheral surface LG4 of the light guide LG. As a method of such a treatment, there can be adopted, for example, a method of printing reflecting dots, a molding method of providing a concavo-convex shape using a stamper or injection, and a groove processing method. In such first light source module 126 and the second light source module 127, when the first light source 121 lights, the detection light L2 is emitted radially from the first light source module 126, and when the second light source 122 lights, the detection light L2 is emitted radially from the second light source module 127.

Configuration of Light Receiving Section 13

Figure 5A:
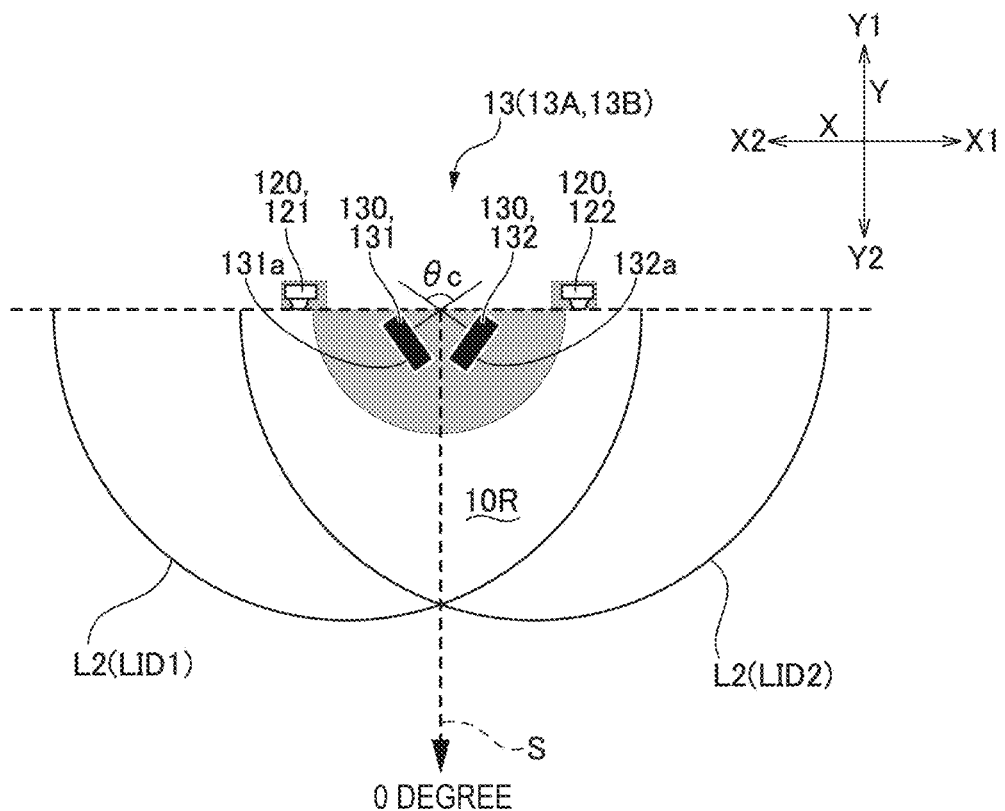
FIGS. 5A and 5B is an explanatory diagram showing a configuration of a light receiving section of the optical position detection device according to the first embodiment of the invention.
Figure 5B:
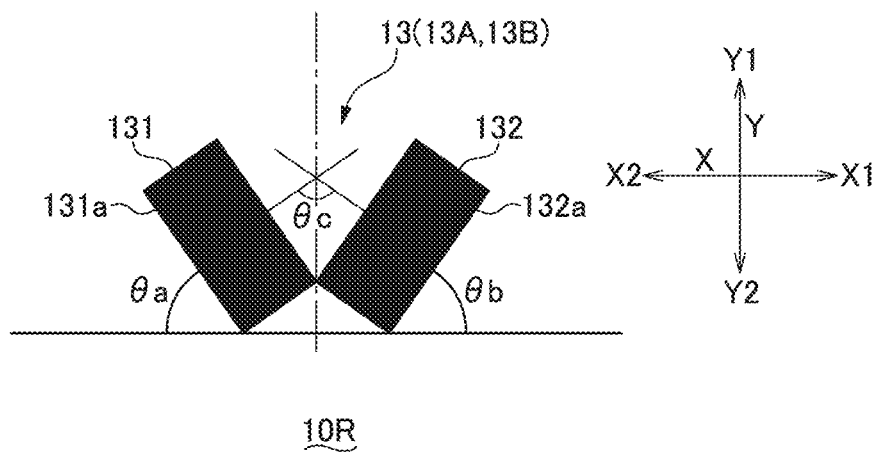

FIGS. 5A and 5B are explanatory diagrams showing the configuration of the light receiving section 13 of the optical position detection device 10 according to the first embodiment of the invention, wherein FIG. 5A is an explanatory diagram showing a positional relationship between the two light receiving elements 130 used in the light receiving section 13, and FIG. 5B is an explanatory diagram showing the two light receiving elements 130 in an enlarged manner. It should be noted that since the first light emitting/receiving unit 15A and the second light emitting/receiving unit 15B have the same configurations, the explanation will be presented being focused on the configuration of the first light emitting/receiving unit 15A, and the detailed explanation on the second light emitting/receiving unit 15B will be omitted.

As shown in FIGS. 2, 3, 4A, 4B, 5A, and 5B, in the optical position detection device 10 according to the present embodiment, the first light emitting/receiving unit 15A has a plurality of light receiving elements 130 in the first light receiving section 13A. More specifically, the first light receiving section 13A is provided with a first light receiving element 131 and a second light receiving element 132 disposed at a position adjacent to the first light receiving element 131 in the X-axis direction as the plurality of light receiving elements 130. Each of the light receiving elements 130 (the first light receiving element 131 and the second light receiving element 132) is, for example, a photodiode or a phototransistor. In the present embodiment, each of the light receiving elements 130 is a photodiode having a sensitivity peak in the infrared range, and has the configuration explained with reference to FIGS. 17A and 17B.

As shown in FIGS. 5A and 5B, the first light receiving element 131 and the second light receiving element 132 are disposed at positions adjacent to each other with the light receiving surface 131a of the first light receiving element 131 and the light receiving surface 132a of the second light receiving element 132 tilted in the directions opposite to each other, and the first light receiving element 131 and the second light receiving element 132 extend in the directions with which the normal directions with respect to the light receiving surfaces 131a, 132a intersect with each other.

Here, the first light receiving element 131 has the light receiving surface 131a facing to one side (the side where the one end portion LG1 of the light guide LG shown in FIG. 3 is located, the side where the first light source 121 is located) of the detection space 10R, and the second light receiving element 132 has the light receiving surface 132a facing to the other side (the side where the other end portion LG2 of the light guide LG shown in FIG. 3 is located, the side where the second light source 122 is located) of the detection space 10R.

Figure 15:
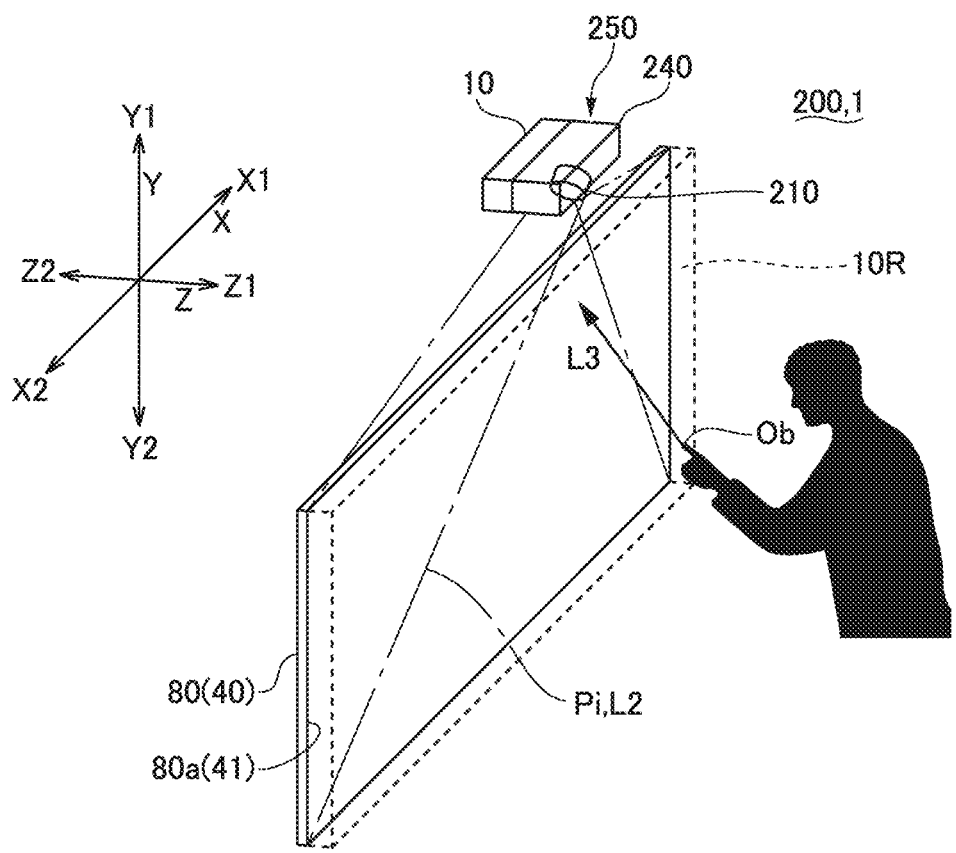
FIG. 15 is an explanatory diagram of a second specific example (a display system with an input function or a projection display system with an input function) of a position detection system to which the embodiment of the invention is applied.

Further, the first light receiving element 131 and the second light receiving element 132 are set to have the intersection angle $\theta c$ greater than 90° and smaller than 180°, the intersection angle being formed between the normal direction with respect to the light receiving surface 131a of the first light receiving element 131 and the normal direction with respect to the light receiving surface 132a of the second light receiving element 132, so as to correspond to the directivity in sensitivity explained with reference to FIG. 15. Therefore, the angle $\theta a$ formed between the light receiving surface 131a of the first light receiving element 131 and the X-axis direction is set to a numerical value greater than 45° and smaller than 90°, and the angle $\theta b$ formed between the light receiving surface 132a of the second light receiving element 132 and the X-axis direction is set to a numerical value greater than 45° and smaller than 90°.

Further, in the present embodiment, the intersection angle $\theta c$ formed between the normal direction with respect to the light receiving surface 131a of the first light receiving element 131 and the normal direction with respect to the light receiving surface 132a of the second light receiving element 132 is set to a numerical value greater than 120° and smaller than 140° based on the data described later with reference to FIGS. 9A through 9D, and 10. Therefore, the angle θa formed between the light receiving surface 131a of the first light receiving element 131 and the X-axis direction is set to a numerical value greater than 60° and smaller than 70°, and the angle θb formed between the light receiving surface 132a of the second light receiving element 132 and the X-axis direction is set to a numerical value greater than 60° and smaller than 70°.

Here, assuming that the angular direction corresponding to the center of the emission range of the detection light L2 emitted from the first light source section 12A is 0° direction, and the plane extending in such a 0° direction is an imaginary plane S, the light receiving surface 131a of the first light receiving element 131 and the light receiving surface 132a of the second light receiving element 132 are arranged line-symmetrically about the imaginary plane S. Therefore, the angle θa formed between the light receiving surface 131a of the first light receiving element 131 and the X-axis direction and the angle θb formed between the light receiving surface 132a of the second light receiving element 132 and the X-axis direction are equal to each other.

It should be noted that the second light receiving section 13B of the second light emitting/receiving unit 15B is also provided with the first light receiving element 131 and the second light receiving element 132 as the plurality of light receiving elements 130 similarly to the first light receiving section 13A.

Control System

Figure 6A:
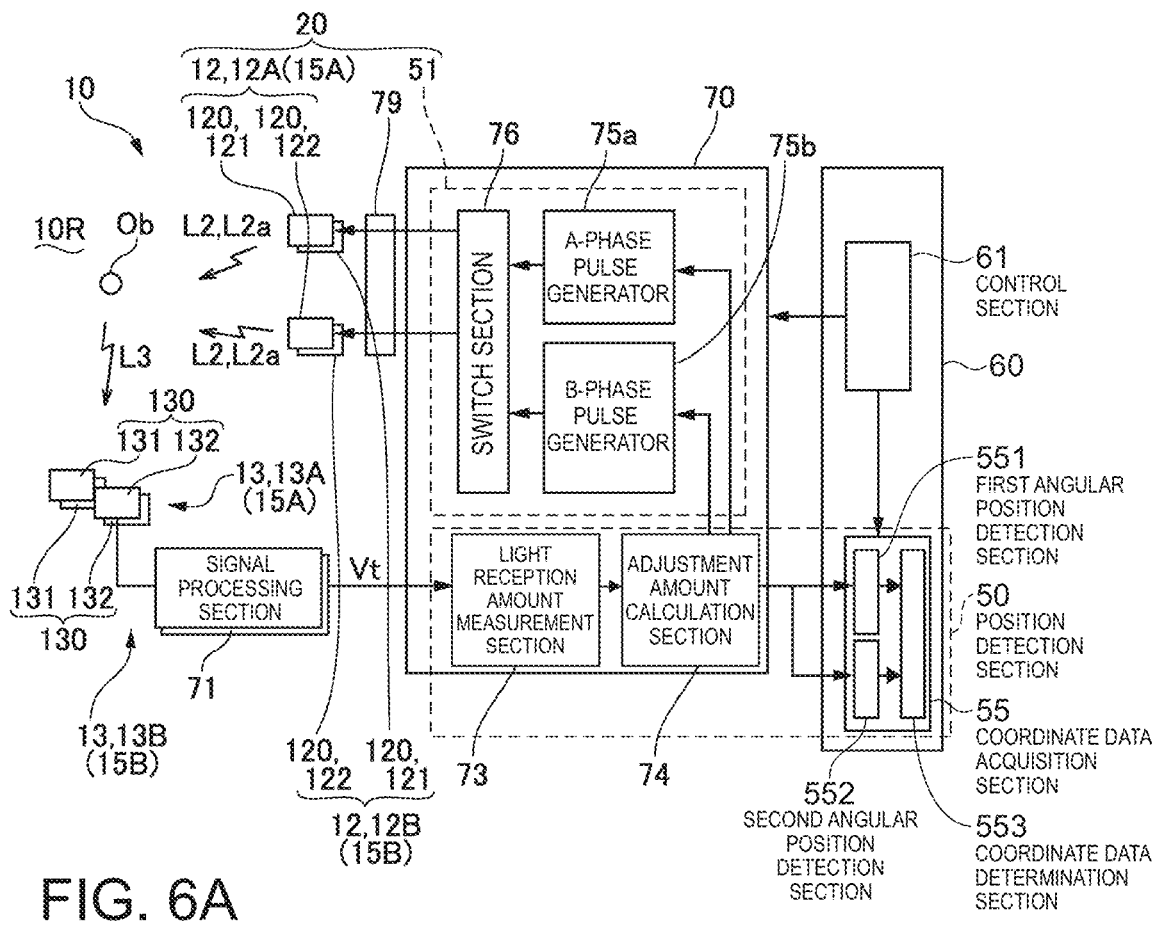
FIGS. 6A and 6B are explanatory diagrams of a control system of the optical position detection device according to the first embodiment of the invention.
Figure 6B:
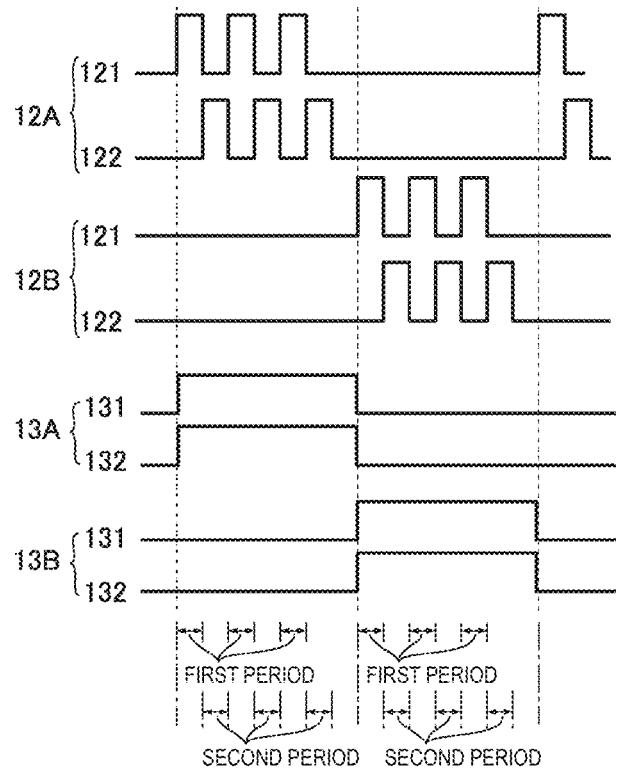

FIGS. 6A and 6B are explanatory diagrams of the control system of the optical position detection device 10 according to the first embodiment of the invention, wherein FIG. 6A is a block diagram of the control system, and FIG. 6B is an explanatory diagram showing a lighting operation and so on by the light source drive section. As shown in FIG. 6A, in the optical position detection device 10, the first light source section 12A of the first light emitting/receiving unit 15A and the second light source section 12B of the second light emitting/receiving unit 15B are electrically connected to a controlling IC 70. Further, the first light receiving section 13A of the first light emitting/receiving unit 15A and the second light receiving section 13B of the second light emitting/receiving unit 15B are electrically connected to the controlling IC 70 via a signal processing section 71. The controlling IC 70 is electrically connected to a host control device 60 such as a personal computer.

The controlling IC 70 has a plurality of circuits (not shown) for generating a reference clock, A-phase reference pulses, B-phase reference pulses, timing control pulses, a synchronous clock, and so on. Further, the controlling IC 70 has a pulse generator 75a for generating predetermined drive pulses based on the A-phase reference pulses, a pulse generator 75b for generating predetermined drive pulses based on the B-phase reference pulses, and a switch section 76 for controlling which one of the first light source 121 and the second light source 122 is provided with the drive pulses generated by the pulse generator 75a and the pulse generator 75b. Such pulse generators 75a, 75b, and the switch section 76 constitute the light source drive section 51.

The light source drive section 51 constitutes the light source device 20 together with the light source section 12 (the first light source section 12A and the second light source section 12B), and the amplification section 79 disposed outside the controlling IC 70, and supplies the first light source 121 and the second light source 122 with the drive current via the amplification section 79. On this occasion, the light source drive section 51 applies the drive pulses with opposite phases to the first light source 121 and the second light source 122 as shown in FIG. 6B to thereby perform the first lighting operation in the first period for putting on the first light source 121 and putting off the second light source 122, and the second lighting operation in the second period for putting on the second light source 122 and putting off the first light source 121. It should be noted that in the light receiving section 13, the first light receiving element 131 and the second light receiving element 132 simultaneously detect the reflected light L3 reflected by the target object Ob in either of the first period and the second period.

By the light source device 20 having such a configuration, a first light intensity distribution LID1 is formed along the X-Y plane in the detection space 10R during the first lighting operation in the first period. Such a first light intensity distribution LID1 is provided with a light intensity distribution, in which the intensity is monotonically reduced in a direction from the angular direction corresponding to the one end portion LG1 toward the angular direction corresponding to the other end portion LG2, in the detection space 10R (the emission range) as shown in FIG. 4A in which the length of the arrows represents the intensity of the detection light. On the other hand, a second light intensity distribution LID2 is formed along the X-Y plane in the detection space 10R during the second lighting operation in the second period. Such a second light intensity distribution LID2 is provided with a light intensity distribution, in which the intensity is monotonically reduced in a direction from the angular direction corresponding to the other end portion LG2 toward the angular direction corresponding to the one end portion LG1, in emission range as shown in FIG. 4B in which the length of the arrows represents the intensity of the detection light. Here, in the optical position detection device 10, voltage amplitude modulation or pulse width modulation is performed when controlling the drive current value to the light source section 12.

It should be noted that the second light emitting/receiving unit 15B is electrically connected to the controlling IC 70 with substantially the same configuration as that of the first light emitting/receiving unit 15A, and the light source drive section 51 also makes the second light source section 12B of the second light emitting/receiving unit 15B perform the first lighting operation in the first period to thereby form the first light intensity distribution LID1 similarly to the first light source section 12A. Further, the second light emitting/receiving unit 15B makes the second light source section 12B perform the second lighting operation in the second period not overlapping the first period to thereby form the second light intensity distribution LID2. Here, the light source drive section 51 performs the first lighting operation (the first period) and the second lighting operation (the second period) of the second light source section 12B of the second light emitting/receiving unit 15B after the first lighting operation (the first period) and the second lighting operation (the second period) of the first light source section 12A of the first light emitting/receiving unit 15A as shown in FIG. 6B.

Again, in FIG. 6A, the controlling IC 70 is provided with a light reception amount measurement section 73 and an adjustment amount calculation section 74 for controlling the pulse generators 75a, 75b based on the measurement result in the light reception amount measurement section 73 to thereby adjust the drive current value (a first drive current value) of the drive pulses to be supplied to the light source 120 (the first light source 121 and the second light source 122) of the light source section 12. Such a light reception amount measurement section 73 and an adjustment amount calculation section 74 take on some of the function of the position detection section 50. The adjustment amount calculation section 74 is provided with an analog-digital conversion section and so on for outputting the control signals to the pulse generators 75a, 75b.

Here, a signal output from the first light receiving element 131 of the light receiving section 13 and a signal output from the second light receiving element 132 are input to the position detection section 50 of the controlling IC 70 via the signal processing section 71 provided with an I-V conversion section, an amplification section, and so on.

Here, the signal processing section 71 is configured to output the result of addition of the level of the signal output from the first light receiving element 131 and the level of the signal output from the second light receiving element 132 to the controlling IC 70 as a detecting signal Vt. Further, the signal processing section 71 may sometimes be configured to compare the level of the signal output from the first light receiving element 131 and the level of the signal output from the second light receiving element 132 with each other, and then output one with a higher signal level to the controlling IC 70 as the detecting signal Vt.

Such a controlling IC 70 is controlled by a control section 61 of the host control device 60 such as a personal computer, and such a control device 60 has a coordinate data acquisition section 55 constituting the position detection section 50 together with the light reception amount measurement section 73 and the adjustment amount calculation section 74. Therefore, in the present embodiment, the position detection section 50 is composed of the light reception amount measurement section 73 and the adjustment amount calculation section 74 of the controlling IC 70, and the coordinate data acquisition section 55 of the host control device 60 (the personal computer).

The optical position detection device 10 according to the present embodiment has the first light emitting/receiving unit 15A and the second light emitting/receiving unit 15B disposed at the positions distant from each other as the light emitting/receiving unit 15. Therefore, the coordinate data acquisition section 55 has a first angular position detection section 551 for detecting the angular position of the target object Ob with respect to the radiation center of the first light source section 12A based on the result of driving the first light emitting/receiving unit 15A, and a second angular position detection section 552 for detecting the angular position of the target object Ob with respect to the radiation center of the second light source section 12B based on the result of driving the second light emitting/receiving unit 15B. Further, the coordinate data acquisition section 55 is provided with a coordinate data determination section 553 for determining the X-Y coordinate data of the target object Ob based on the angular position of the target object Ob obtained by the first angular position detection section 551 and the angular position of the target object Ob obtained by the second angular position detection section 552.

It should be noted that although in the present embodiment the first light emitting/receiving unit 15A and the second light emitting/receiving unit 15B are driven by the single controlling IC 70 by making the controlling IC 70 multiple-channel, it is also possible to use two controlling ICs 70 respectively having one-to-one relationships with the first light emitting/receiving unit 15A and the second light emitting/receiving unit 15B.

Operation of Detecting Position of Target Object

Figure 7A:
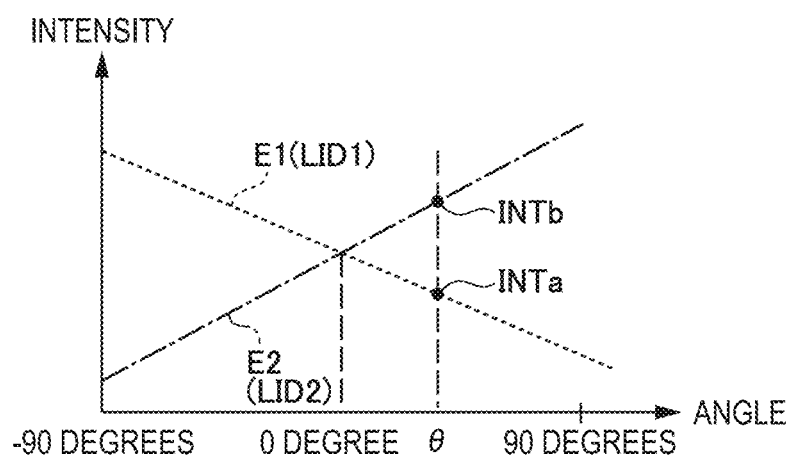
FIGS. 7A and 7B are explanatory diagrams of a position detection principle in the optical position detection device according to the first embodiment of the invention.
Figure 7B:
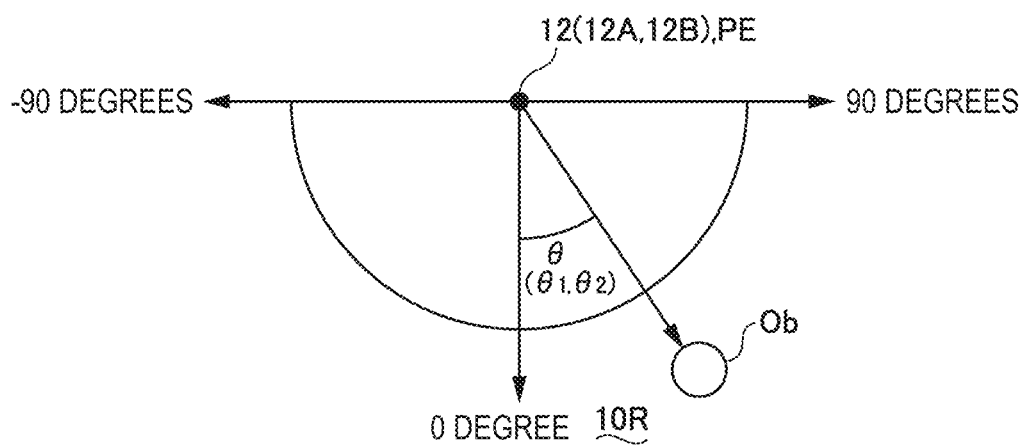
Figure 8:
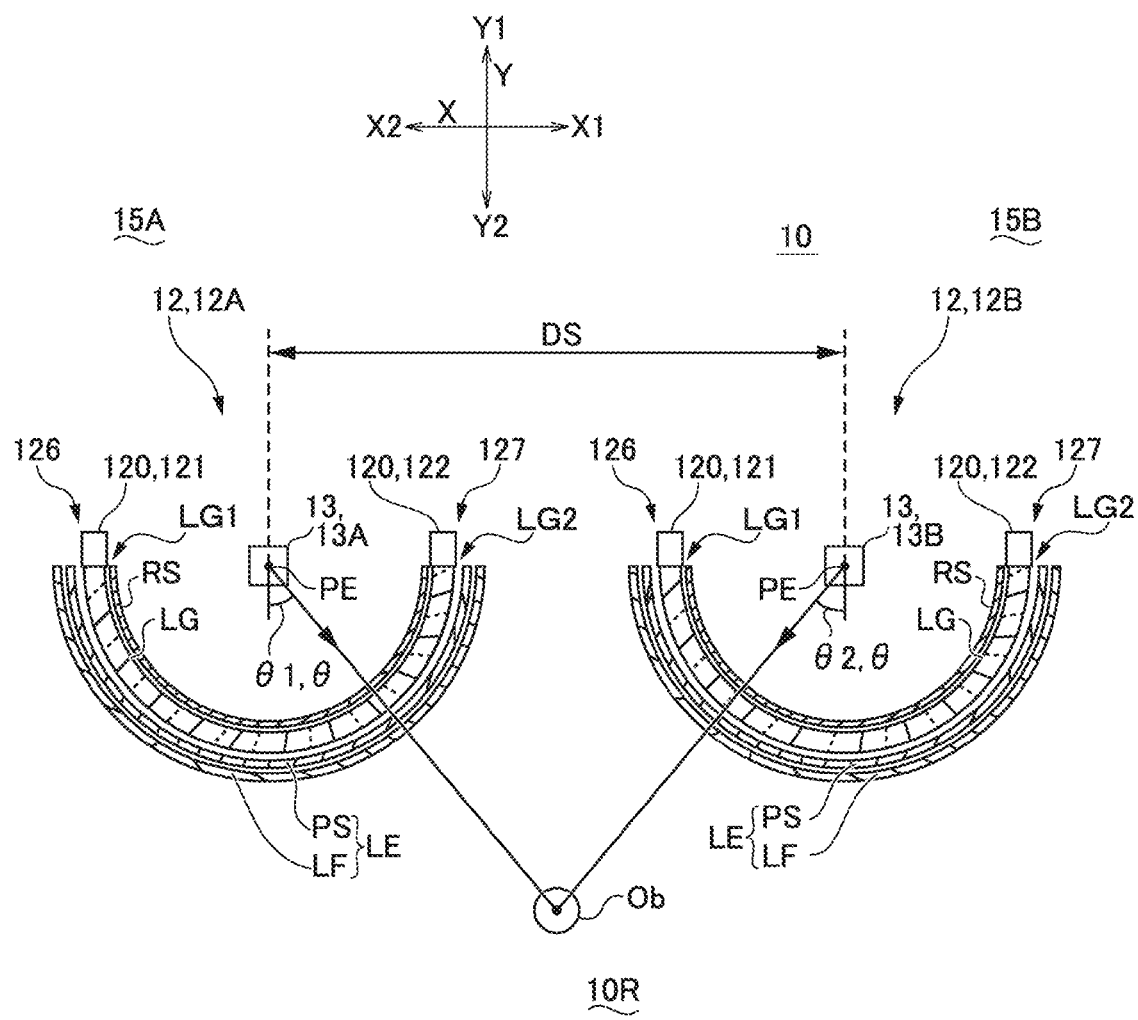
FIG. 8 is an explanatory diagram of a principle of obtaining the X-Y coordinate data of the target object in the optical position detection device according to the first embodiment of the invention.

FIGS. 7A and 7B are explanatory diagrams of the position detection principle in the optical position detection device 10 according to the first embodiment of the invention, wherein FIG. 7A is an explanatory diagram of the light intensity distribution, and FIG. 7B is an explanatory diagram of a method of obtaining the position information (an angular position, orientation information) at which the target object Ob is located. FIG. 8 is an explanatory diagram of a principle of obtaining the X-Y coordinate data of the target object Ob in the optical position detection device 10 according to the first embodiment of the invention. In FIGS. 7A and 7B, it is assumed that the angular direction corresponding to the center (the front of the light receiving section 13) of the emission range of the detection light L2 emitted from the light source section 12 is 0°.

In the present embodiment, firstly, when forming the first light intensity distribution LID1 using the first light source module 126 of the first light source section 12A, the emission angular direction of the detection light L2 and the intensity of the detection light L2 are in a linear relation represented by the line E1 in FIG. 7A. Further, when forming the second light intensity distribution LID2 using the second light source module 127 of the first light source section 12A, the emission angular direction of the detection light L2 and the intensity of the detection light L2 are in a linear relation represented by the line E2 in FIG. 7A. Here, it is assumed that the target object Ob is located in the direction of the angle θ viewed from the center PE (the radiation center position of the detection light L2) of the first light source section 12A as shown in FIGS. 7B and 8. In this case, when forming the first light intensity distribution LID1, the intensity of the detection light L2 at the position where the target object Ob is located becomes INTa. In contrast, when forming the second light intensity distribution LID2, the intensity of the detection light L2 at the position where the target object Ob is located becomes INTb. Therefore, by obtaining the relationship between the intensities INTa, INTb by comparing the light reception intensity in the first light receiving section 13A when forming the first light intensity distribution LID1 and the light reception intensity in the first light receiving section 13A when forming the second light intensity distribution LID2 with each other, the angle θ (an angle θ1, the angular position) of the direction in which the target object Ob is located can be obtained based on the center PE of the first light source section 12A as shown in FIGS. 7B and 8.

In detecting the angular position (the angle θ1) of the target object Ob using such a principle, in the present embodiment, the first drive current value to the first light source section 12A and the second drive current value to the first light source section 12A are adjusted so that the intensity of the signal output from the first light receiving section 13A in the first period during which the first light intensity distribution LID1 is formed by the first light source section 12A and the intensity of the signal output from the first light receiving section 13A in the second period during which the second light intensity distribution LID2 is formed are equal to each other.

Here, the intensity of the signal output from the first light source section 12A is proportional to the first drive current value to the light source 120 and the second drive current value to the light source 120. Therefore, it is possible to obtain the angle θ (the angle θ1) of the direction in which the target object Ob is located based on the ratio and the difference between the first drive current value and the second drive current value after adjusting the first drive current value to the light source 120 and the second drive current value to the light source 120, or based on the ratio and the difference between the adjustment values when adjusting the drive current values.

More specifically, firstly, the light source drive section 51 of the controlling IC 70 shown in FIG. 6A performs the first lighting operation of lighting the first light source 121 to thereby form the first light intensity distribution LID1, and then performs the second lighting operation of lighting the second light source 122 to thereby form the second light intensity distribution LID2. On this occasion, firstly, the light source device 20 drives the first light source 121 and the second light source 122 of the first light source section 12A with the preset reference drive current value in the first period and the second period. In the present embodiment, the reference drive current value to the first light source 121 and the reference drive current value to the second light source 122 are equal to each other. Therefore, the first light intensity distribution LID1 and the second light intensity distribution LID2 have the directions of the intensity variation opposite to each other but have the same intensity levels. Further, the first light receiving element 131 and the second light receiving element 132 of the first light receiving section 13A detect the reflected light L3, and the signals output from the first light receiving element 131 and the second light receiving element 132 are output to the controlling IC 70 via the signal processing section 71 as the detecting signal Vt.

Then, the adjustment amount calculation section 74 of the position detection section 50 compares the light reception intensity INTa of the first light receiving section 13A in the first lighting operation and the light reception intensity INTb of the first light receiving section 13A in the second lighting operation with each other. As a result, if the light reception intensity INTa of the first light receiving section 13A in the first lighting operation and the light reception intensity INTb of the first light receiving section 13A in the second lighting operation are equal to each other, the angular position of the target object Ob is 0°.

In contrast, if the light reception intensities INTa, INTb are different from each other, the first drive current value to the first light source 121 and the second drive current value to the second light source 122 are adjusted so that the light reception intensity INTa of the first light receiving section 13A in the first lighting operation and the light reception intensity INTb of the first light receiving section 13A in the second lighting operation become equal to each other. Then, when performing the first lighting operation and the second lighting operation again, if the light reception intensity INTa of the first light receiving section 13A in the first lighting operation and the light reception intensity INTb of the first light receiving section 13A in the second lighting operation are equal to each other, it is possible for the first angular position detection section 551 shown in FIG. 6A to obtain the angle θ (the angle θ1) of the direction in which the target object Ob is located based on the ratio and the difference between the drive current values corresponding respectively to the first light source 121 and the second light source 122 after performing the adjustment described above, or based on the ratio and the difference between the adjustment amounts of the drive current values. In the present embodiment, the angle θ (the angle θ1) of the direction in which the target object Ob is located is obtained based on the ratio and the difference between the adjustment amount from the reference drive current value to the first drive current value and the adjustment amount from the reference drive current value to the second drive current value at the time point when the light reception intensity INTa of the first light receiving section 13A in the first lighting operation and the light reception intensity INTb of the first light receiving section 13A in the second lighting operation have become equal to each other.

By performing such an operation also in the second light source section 12B, it is possible for the second angular position detection section 552 to obtain the angle θ (the angle θ2, the angular position) of the direction in which the target object Ob is located based on the center PE of the second light source section 12B. Therefore, since the center-to-center distance DS is constant as shown in FIG. 8, it is possible for the coordinate data determination section 553 to obtain the position corresponding to the intersection between the angular position (the direction at the angle θ1) detected by the first angular position detection section 551 and the angular position (the direction at the angle θ2) detected by the second angular position detection section 552 as the X-Y coordinate data at which the target object Ob is located.

Positional Relationship Between First Light Receiving Element 131 and Second Light Receiving Element 132

FIGS. 9A through 9D are graphs showing the relationship between the tilt of the light receiving surface of the light receiving element 130 and the level of the signal output from the light receiving element 130 in the optical position detection device 10 according to the first embodiment of the invention, wherein FIGS. 9A, 9B, 9C, and 9D are graphs with the intersection angle θc of 40°, 80°, 100°, and 120°, respectively. FIG. 10 is a graph showing the directivity in sensitivity in the light receiving section 13 in the case of setting the intersection angle to 100° in the optical position detection device according to the first embodiment of the invention.

More specifically, FIGS. 9A, 9B, 9C, and 9D show the level of the output current from the first light receiving element 131 when shifting the angular position of the target object Ob in the condition of forming the first light intensity distribution LID1 in the first period (the first lighting operation) in the case in which the angle θa formed between the light receiving surface 131a of the first light receiving element 131 and the X-axis direction is 20°, 40°, 50°, and 60°, respectively, using the line V1 (Phase B). Further, FIGS. 9A, 9B, 9C, and 9D show the level of the output current from the first light receiving element 131 when shifting the angular position of the target object Ob in the condition of forming the second light intensity distribution LID2 in the second period (the second lighting operation) in the case in which the angle θa formed between the light receiving surface 131a of the first light receiving element 131 and the X-axis direction is 20°, 40°, 50°, and 60°, respectively, using the line V2 (Phase A). Further, FIGS. 9A, 9B, 9C, and 9D show the difference between the level of the output current from the first light receiving element 131 in the first period (in the first lighting operation) and the level of the output current from the first light receiving element 131 in the second period (in the second lighting operation) in the case in which the angle θa formed between the light receiving surface 131a of the first light receiving element 131 and the X-axis direction is 20°, 40°, 50°, and 60°, respectively, using the line V3. It should be noted that in FIGS. 9A through 9D, the left vertical axis of each of the drawings represents the scale of the level of the output current from the first light receiving element 131, and the right vertical axis of each of the drawings represents the scale of the difference.

Further, FIG. 10 shows the directivity in sensitivity obtained by combining the directivity in sensitivity of the first light receiving element 131 in the case in which the intersection angle θc is 100° and the directivity in sensitivity of the second light receiving element 132 with each other. It should be noted that in FIGS. 9A through 9D, and 10, the horizontal axis represents the angular position (the incident angle of the reflected light L3) of the target object Ob assuming that the direction corresponding to the one side (the other side X2 in the X-axis direction) in the emission space of the detection light L2 is 0°.

Figure 18A:
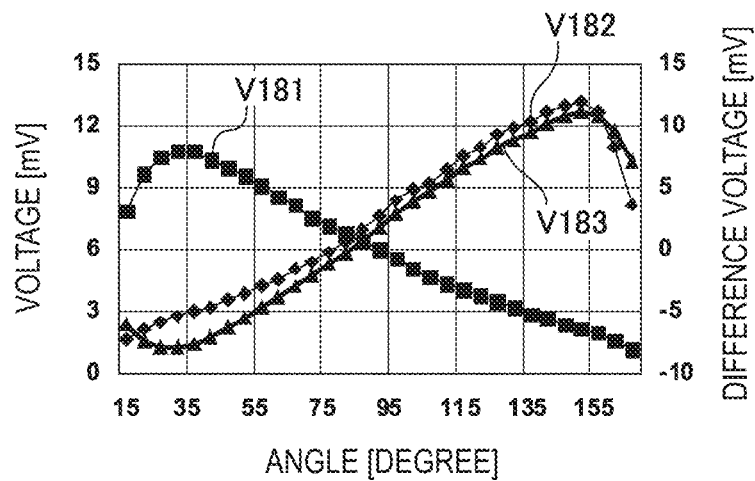
FIGS. 18A and 18B are explanatory diagrams showing the directivity in sensitivity of a light receiving section in the optical position detection device according to the reference example of the invention.
Figure 18B:
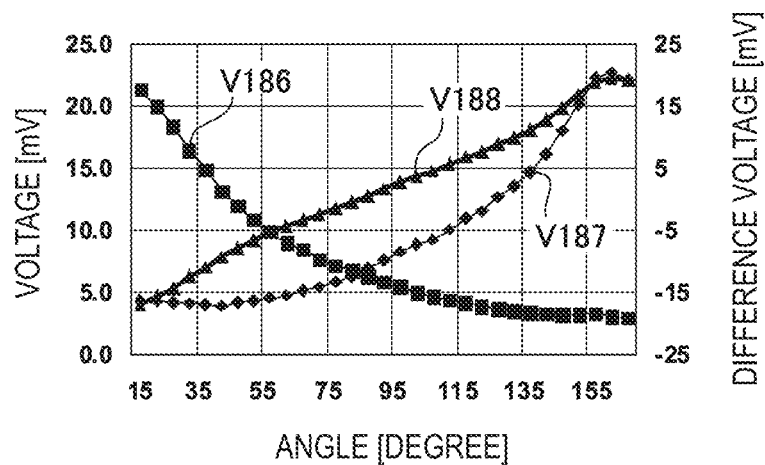

As is understood from the result shown in FIGS. 9A through 9D, in either of the cases in which the intersection angle θc takes respective values of 40° through 120°, the level of the output signal from the first light receiving element 131 is higher, and the angular range in which the difference thereof between the first period and the second period varies monotonically is wider even in the case in which the target object Ob is located in the direction significantly tilted from the normal direction with respect to the light receiving surface 131a of the first light receiving element 131 in comparison with the result shown in FIG. 18A.

Figure 9A:
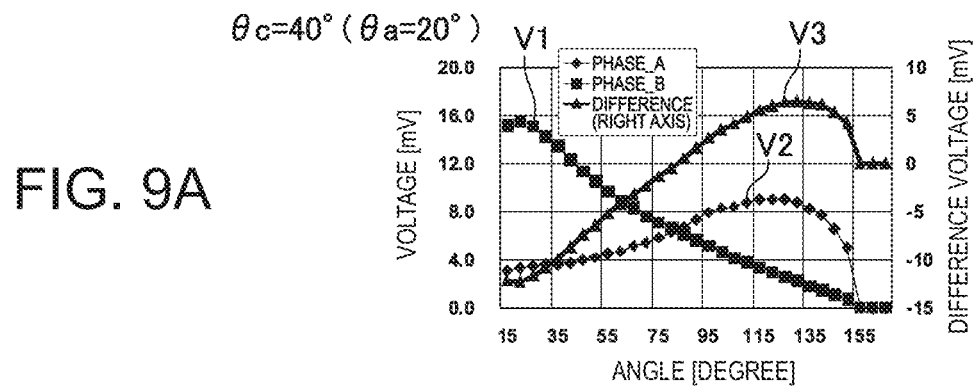
FIGS. 9A through 9D are graphs showing a relationship between the tilt of the light receiving surface of the light receiving element and the level of the signal output from the light receiving element in the optical position detection device according to the first embodiment of the invention.
Figure 9B:
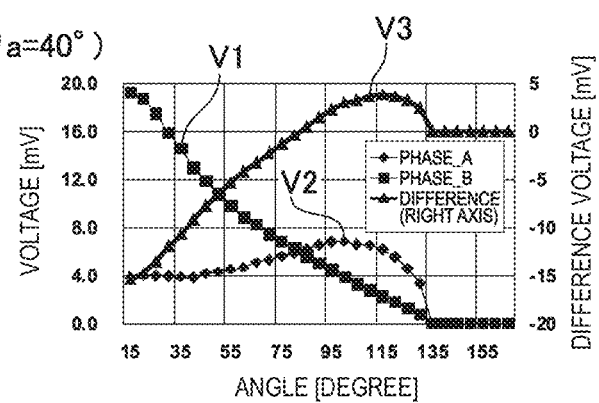
Figure 9C:
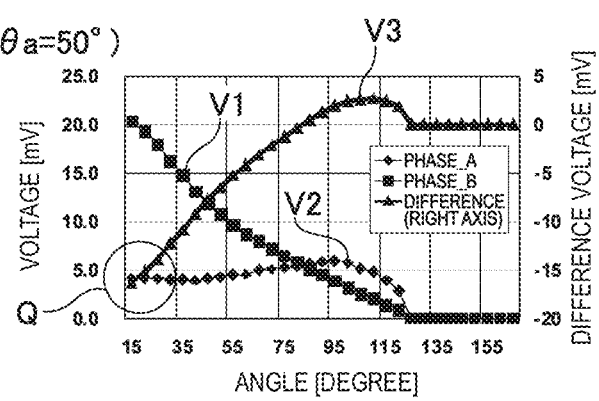
Figure 9D:
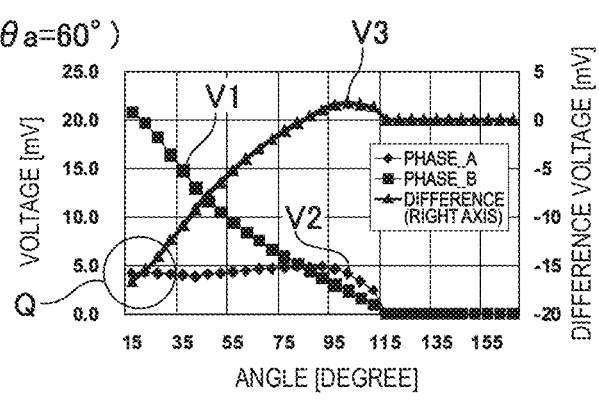
Figure 10:
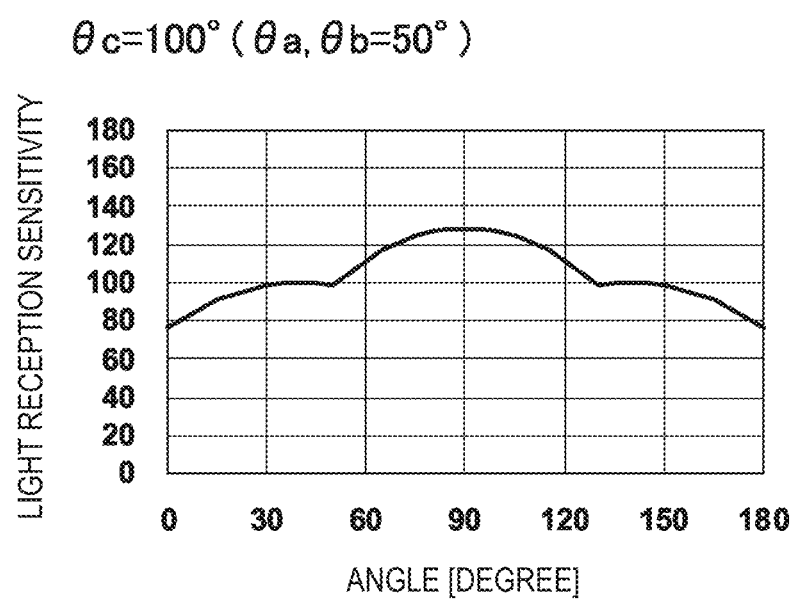
FIG. 10 is a graph showing the directivity in sensitivity in the light receiving section in the case of setting the intersection angle to 100° in the optical position detection device according to the first embodiment of the invention.

Further, when comparing the results shown in FIGS. 9A through 9D, if the intersection angle θc takes the values of 100° and 120° as shown in FIGS. 9C and 9D, the variation of the difference in the case in which the target object Ob is located in the direction significantly tilted from the normal direction with respect to the light receiving surface 131a of the first light receiving element 131 toward the other side X2 of the X-axis direction is large as in the areas indicated by the circles Q compared to the cases in which the intersection angle θc takes the values of 40° and 80° as shown in FIGS. 9A and 9B. Therefore, it can be said that the detection accuracy is high in the case in which the intersection angle θc takes the values of 100° and 120° compared to the case in which the intersection angle θc takes the values of 40° and 80°.

Therefore, the directivity in sensitivity of the light receiving section 13 in the case, for example, in which the first light receiving element 131 and the second light receiving element 132 are arranged so that the intersection angle θc takes 100° is expressed as the result of combining the directivity in sensitivity of the first light receiving element 131 and the directivity in sensitivity of the second light receiving element 132 with each other, and the directivity in sensitivity in such a light receiving section 13 becomes to have the characteristics shown in FIG. 10. As is understood from FIG. 10, since the light reception sensitivity in the light receiving section 13 has a high level throughout the angular range from 0° to 180°, the detection accuracy is kept high throughout the angular range from 0° to 180°.

When performing substantially the same evaluation on the case of the intersection angle θc other than the angle values described above, it could be confirmed that the high detection accuracy could be obtained throughout the wide angular range by setting the intersection angle θc in the following range.

$$90°<θc<180°$$

Further, it could be confirmed that the high detection accuracy can be obtained throughout the wide angular range from 0° to 180° by setting the intersection angle θc in the following range.

$$120°<θc<140°$$

Therefore, in the present embodiment, since the intersection angle θc is set in the appropriate range described above as is explained with reference to FIGS. 5A and 5B in either of the first light receiving section 13A of the first light emitting/receiving unit 15A and the second light receiving section 13B in the second light emitting/receiving unit 15B, the detection accuracy is kept high.

Major Advantages of Present Embodiment

As explained hereinabove, according to the present embodiment, since the reflected light L3 from the target object Ob is detected using the plurality of light receiving elements 130 (the first light receiving element 131 and the second light receiving element 132) as the light receiving element 130, when the reflected light L3 enters the first light receiving element 131 in the direction in which the light reception sensitivity is low, the reflected light L3 enters the second light receiving element 132 in the direction in which the light reception sensitivity is high. Similarly, when the reflected light L3 enters the second light receiving element 132 in the direction in which the light reception sensitivity is low, the reflected light L3 enters the first light receiving element 131 in the direction in which the light reception sensitivity is high. Therefore, the detection space 10R can be enlarged.

Further, the first light receiving element 131 and the second light receiving element 132 are arranged to have the intersection angle θc greater than 90° and smaller than 180°, the intersection angle being formed between the normal direction with respect to the light receiving surface 131a of the first light receiving element 131 and the normal direction with respect to the light receiving surface 132a of the second light receiving element 132. Therefore, even in the case of disposing the first light receiving element 131 and the second light receiving element 132 at the position adjacent to each other to thereby achieve downsizing of the device, when the reflected light L3 enters one of the first light receiving element 131 and the second light receiving element 132 in the direction in which the light reception sensitivity is low, the reflected light L3 enters the other thereof in the direction in which the light reception sensitivity is high. Therefore, even in the case of expanding the detection space 10R, the position of the target object Ob can be detected with accuracy without making the device grow in size. Further, in the present embodiment, the intersection angle θc is larger than 120° and smaller than 140°. Therefore, when the reflected light L3 enters one of the first light receiving element 131 and the second light receiving element 132 in the direction in which the light reception sensitivity is low, the reflected light L3 enters the other thereof in the direction in which the light reception sensitivity is high, and therefore, the high detection sensitivity can be obtained throughout the wide angular range of 0° through 180°.

Further, the signal processing section 71 outputs the result of addition of the level of the signal output from the first light receiving element 131 and the level of the signal output from the second light receiving element 132 to the controlling IC 70 as a detecting signal Vt. Therefore, since the position detection section 50 detects the position of the target object Ob using the signal with a high level as the detecting signal Vt, the detection space 10R is wide.

It should be noted that the signal processing section 71 may sometimes be configured to compare the level of the signal output from the first light receiving element 131 and the level of the signal output from the second light receiving element 132 with each other, and then output one with a higher signal level to the controlling IC 70 as the detecting signal Vt, and in the case of such a configuration, there is no need to enlarge the input range of the position detection section 50. Therefore, the position detection section 50 can detect the position of the target object Ob with high resolution.

Second Embodiment

Configuration and Operation

Figure 11A:
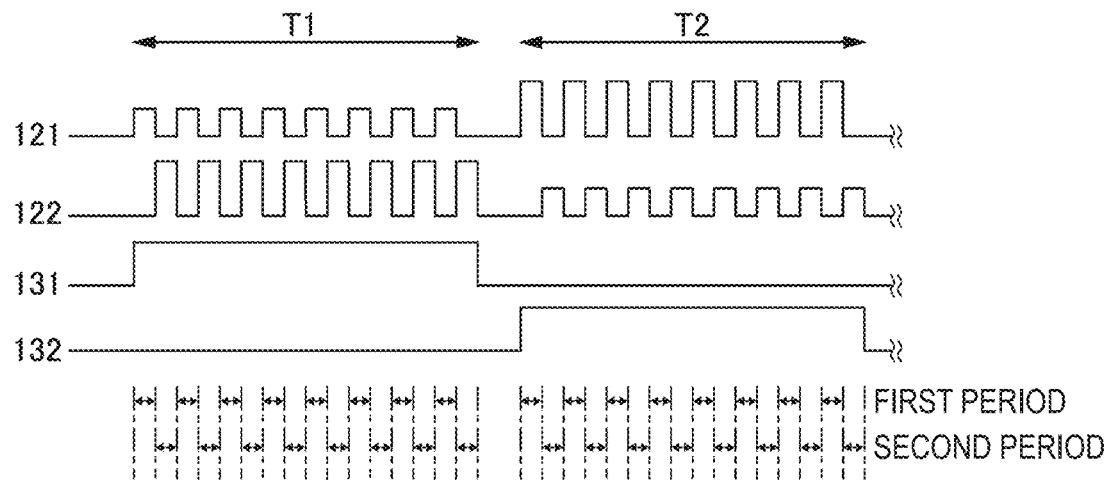
FIGS. 11A through 11C are explanatory diagrams of the optical position detection device according to a second embodiment of the invention.
Figures 11B, 11C:
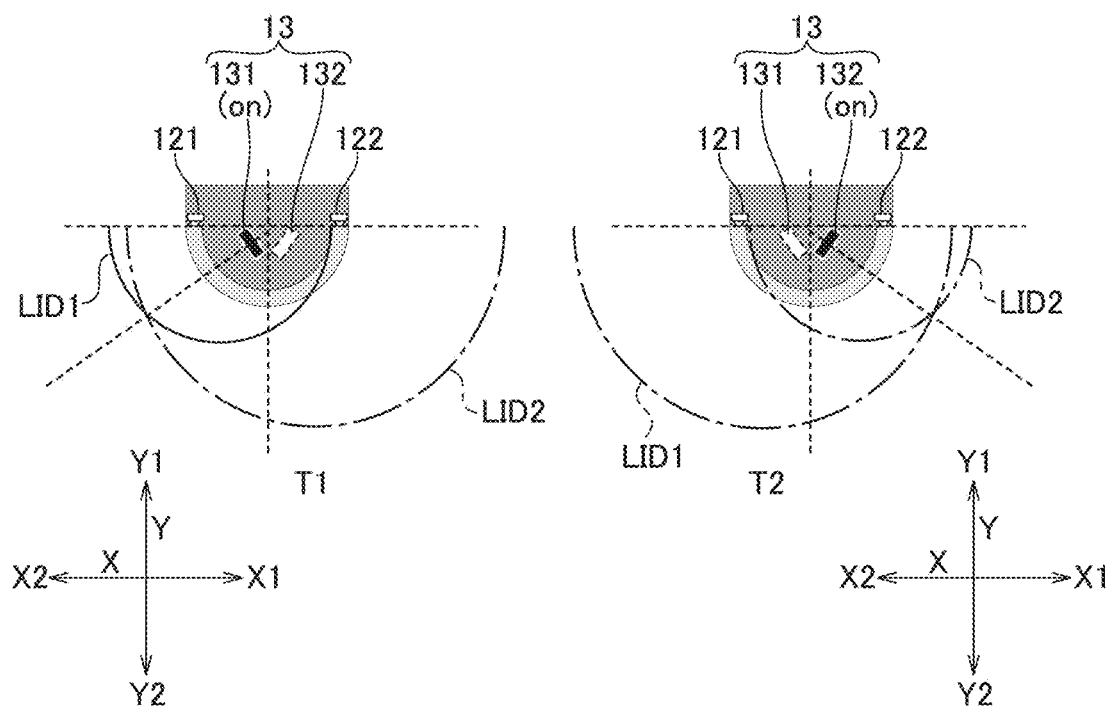
Figures 12A, 12B:
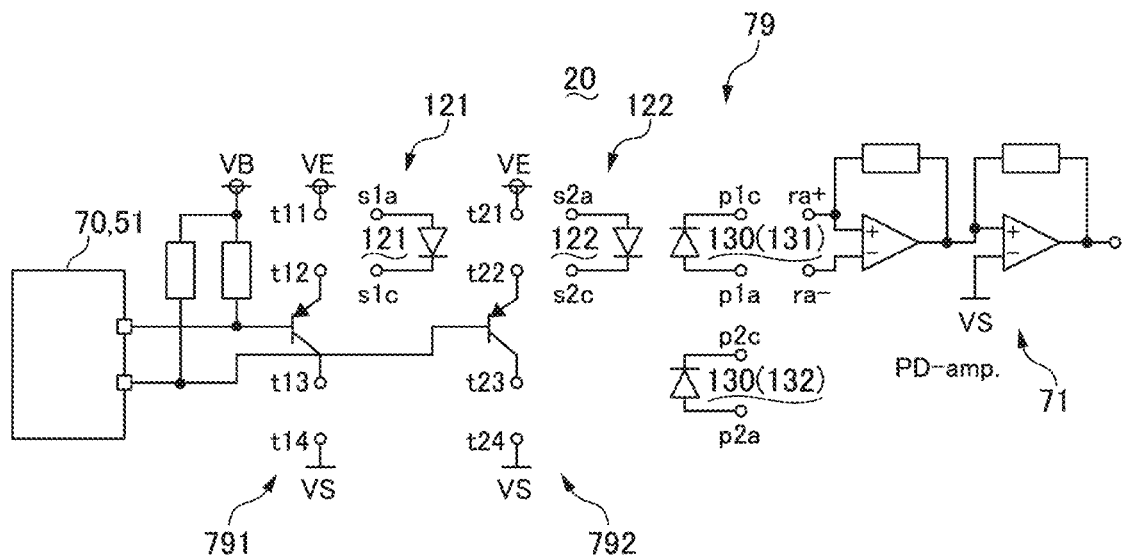
FIGS. 12A and 12B are is explanatory diagrams showing an electrical configuration of an amplification section of the optical position detection device according to the second embodiment of the invention.

FIGS. 11A through 11C are explanatory diagrams of the optical position detection device 10 according to the second embodiment of the invention, wherein FIG. 11A is an explanatory diagram showing a lighting operation and so on of the optical position detection device 10 according to the second embodiment of the invention, FIG. 11B is an explanatory diagram of the period during which the first light receiving element 131 is set to the detection mode, and FIG. 11C is an explanatory diagram of the period during which the second light receiving element 132 is set to the detection mode. FIGS. 12A and 12B are explanatory diagrams showing an electrical configuration of the amplification section 79 and so on of the optical position detection device 10 according to the second embodiment of the invention, wherein FIG. 12A is an explanatory diagram of a switching section of the electrical connection in the amplification section 79 and so on, and FIG. 12B is an explanatory diagram showing the switching operation. It should be noted that since the basic configuration of the present embodiment is substantially the same as in the first embodiment, common parts are denoted with the same reference symbols and the explanation therefor will be omitted.

Similarly to the first embodiment, also in the present embodiment, the first light receiving element 131 and the second light receiving element 132 are used in the light receiving section 13 as the light receiving element 130 as explained with reference to FIGS. 5A and 5B. Further, similarly to the first embodiment, also in the present embodiment, the first light intensity distribution LID1 is formed (the first lighting operation) by lighting the first light source 121 in the first period, and the second light intensity distribution LID2 is formed (the second lighting operation) by lighting the second light source 122 in the second period as shown in FIG. 11A. Further, similarly to the first embodiment, also in the present embodiment, when detecting the position of the target object Ob, the drive current value in the first period and the drive current value in the second period are varied based on the result of comparison between the level of the detecting signal Vt in the first period and the level of the detecting signal Vt in the second period when emitting the detection light L2 with the reference drive current value in the first period and the second period. Then, when the level of the detecting signal Vt in the first period and the level of the detecting signal Vt in the second period become equal to each other, the position of the target object Ob is detected based on the comparison result between the adjustment amount of the drive current value in the first period from the reference drive current value and the adjustment amount of the drive current value in the second period from the reference drive current value.

Here, although in the first embodiment the first light receiving element 131 and the second light receiving element 132 are simultaneously used for the detection of the reflected light L3 as explained with reference to FIG. 6B, in the present embodiment, the first light receiving element 131 and the second light receiving element 132 are set to the detection mode in the respective periods different from each other as shown in FIGS. 11A through 11C. More specifically, as shown in FIGS. 11A and 11B, the first light receiving element 131 is set to the detection mode in the period T1, and in this period, the first lighting operation (the first period) of lighting the first light source 121, and the second lighting operation (the second period) of lighting the second light source 122 are performed. Further, as shown in FIGS. 11A and 11C, the second light receiving element 132 is set to the detection mode in the period T2, and in this period, the first lighting operation (the first period) of lighting the first light source 121, and the second lighting operation (the second period) of lighting the second light source 122 are performed.

Further, although in the first embodiment it is assumed that the reference drive current value in the first period is the same as the reference drive current value in the second period, in the present embodiment, the reference drive current value in the first period is set to be lower than the reference drive current value in the second period in the period T1 in which the first light receiving element 131 is set to the detection mode as shown in FIGS. 11A and 11B. In contrast, in the period T2 in which the second light receiving element 132 is set to the detection mode, the reference drive current value in the second period is set to be lower than the reference drive current value in the first period as shown in FIGS. 11A and 11C.

Such an operation can be realized by adopting the circuit configuration shown in FIG. 12A. More specifically, the amplification section 79 of the light source device 20 is provided with a first amplification section 791 with respect to the first light source 121 for emitting the detection light L2 in the first period, and is provided with a second amplification section 792 with respect to the second light source 122 for emitting the detection light L2 in the second period. Further, a bipolar transistor is used as the first amplification section 791, and the first light source 121 is switched between the state in which the first light source 121 is connected between the emitter of the transistor and a first electrical potential VE and the state in which the first light source 121 is connected between the collector thereof and a second electrical potential VS to thereby switch the reference drive current value supplied to the first light source 121. Further, similarly to the first amplification section 791, a bipolar transistor is also used as the second amplification section 792, and the second light source 122 is switched between the state in which the second light source 122 is connected between the emitter of the transistor and the first electrical potential VE and the state in which the second light source 122 is connected between the collector thereof and the second electrical potential VS to thereby switch the reference drive current value supplied to the second light source 122. It should be noted that the light source drive section 51 outputs the electrical potential for controlling the electrical potential to be applied to the base of the transistor, and the drive current values to be supplied to the first light source 121 and the second light source 122 are controlled by the electrical potential.

Further, in the light receiving section 13, the light receiving element 130 electrically connected to the terminals ra+, ra− of the signal processing section 71 is switched between the first light receiving element 131 and the second light receiving element 132 in the periods T1, T2.

According to such a circuit configuration, as shown in FIG. 12B, by switching the connection between the terminals, it is possible to set the reference drive current value in the first period to be lower than the reference drive current value in the second period in the period T1 in which the first light receiving element 131 is set to the detection mode, and it is possible to set the reference drive current value in the second period to be lower than the reference drive current value in the first period in the period T2 in which the second light receiving element 132 is set to the detection mode.

Firstly, in the period T1 in which the first light receiving element 131 is set to the detection mode, the terminals ra+, ra− of the signal processing section 71 are electrically connected to terminals p1c, p1a of the first light receiving element 131, respectively. Then, the terminals s1a, sic of the first light source 121 are electrically connected to terminals t13, t14 of the first amplification section 791 while shorting terminals t11, t12 of the first amplification section 791. Meanwhile, terminals s2a, s2c of the second light source 122 are electrically connected to terminals t21, t22 of the second amplification section 792 while shorting terminals t23, t24 of the second amplification section 792. Then, in the first period, the first light source 121 is energized to form the first light intensity distribution LID1, and in the second period, the second light source 122 is energized to form the second light intensity distribution LID2. Here, the first light source 121 is supplied with the collector current, while the second light source 122 is supplied with the emitter current. Therefore, the magnitude relation of the reference drive currents supplied to the first light source 121 and the second light source 122 is as follows.

(first light source 121)<(second light source 122)

In contrast, in the period T2 in which the second light receiving element 132 is set to the detection mode, the terminals ra+, ra− of the signal processing section 71 are electrically connected to the terminals p2c, p2a of the second light receiving element 132, respectively. Then, the terminals s1a, s1c of the first light source 121 are electrically connected to the terminals t11, t12 of the first amplification section 791 while shorting the terminals t13, t14 of the first amplification section 791. Meanwhile, the terminals s2a, s2c of the second light source 122 are electrically connected to terminals t23, t24 of the second amplification section 792 while shorting the terminals t21, t22 of the second amplification section 792. Then, in the first period, the first light source 121 is energized to form the first light intensity distribution LID1, and in the second period, the second light source 122 is energized to form the second light intensity distribution LID2. Here, the first light source 121 is supplied with the emitter current, while the second light source 122 is supplied with the collector current. Therefore, the magnitude relation of the reference drive currents supplied to the first light source 121 and the second light source 122 is as follows.

(first light source 121)>(second light source 122)

Such a configuration is common to the first light emitting/receiving unit 15A and the second light emitting/receiving unit 15B.

Major Advantages of Present Embodiment

Figure 13A:
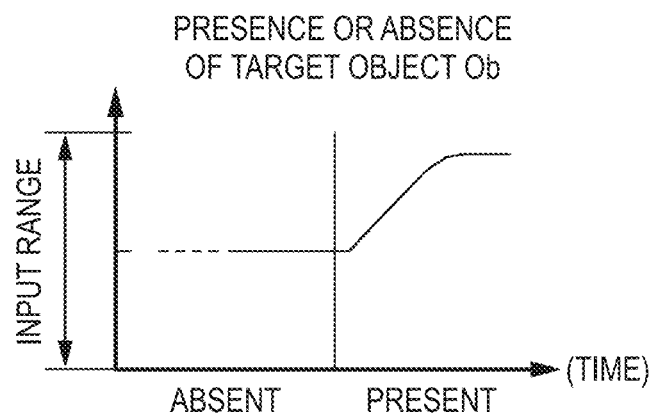
FIGS. 13A and 13B are explanatory diagrams showing an advantage of the optical position detection device according to the second embodiment of the invention.
Figure 13B:
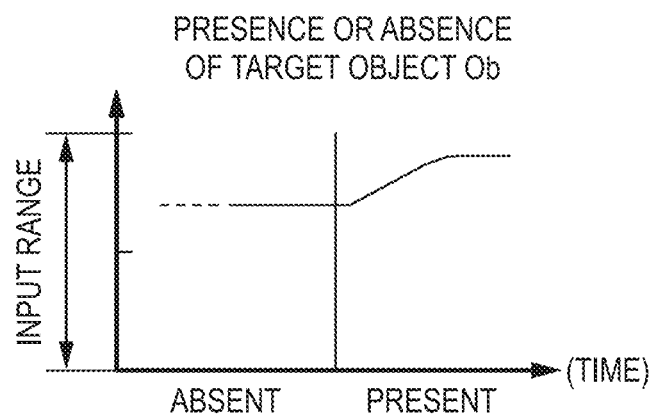

FIGS. 13A and 13B are explanatory diagrams showing the advantages of the optical position detection device 10 according to the second embodiment of the invention, wherein FIG. 13A is an explanatory diagram of the detection range in the case of applying the switching structure of the present embodiment, and FIG. 13B is an explanatory diagram of the detection range in the case of failing to apply the switching structure of the present embodiment.

In the present embodiment, the reference drive current value in the first period is set to be lower than the reference drive current value in the second period in the period T1 in which the first light receiving element 131 is set to the detection mode, and the reference drive current value in the second period is set to be lower than the reference drive current value in the first period in the period T2 in which the second light receiving element 132 is set to the detection mode. Therefore, since there is no need to expand the input range of the position detection section 50, the position detection section 50 can detect the position of the target object Ob with high resolution.

More specifically, when emitting the detection light L2, stray light reflected by an object other than the target object Ob also enters the light receiving section 13. Further, when forming the first light intensity distribution LID1 in the first period, since the first light receiving element 131 has the light receiving surface 131a pointed at the area with higher light intensity in the first light intensity distribution LID1, the intensity of the stray light entering the first light receiving element 131 is higher than the intensity of the stray light entering the second light receiving element 132. Further, when forming the second light intensity distribution LID2 in the second period, since the second light receiving element 132 has the light receiving surface 132a pointed at the area with higher light intensity in the second light intensity distribution LID2, the intensity of the stray light entering the second light receiving element 132 is higher than the intensity of the stray light entering the first light receiving element 131.

Therefore, if the reference drive current value in the first period and the reference drive current value in the second period are set to the same value in the period T1 in which the first light receiving element 131 is set to the detection mode, the level of the signal output from the first light receiving element 131 in the first period is shifted in a certain direction from the central value of the input range allowed in the position detection section 50 already in the state in which the target object Ob does not exist as shown in FIG. 13B. Therefore, when performing the first period in the state in which the target object Ob exists, the adjustment range of the value of the drive current to be supplied to the first light source 121 is limited, and thus the detection range is limited. The same is applied to the second period in the period T2 in which the second light receiving element 132 is set to the detection mode.

However, in the present embodiment, since the reference drive current value in the first period is set to be lower than the reference drive current value in the second period in the period T1 in which the first light receiving element 131 is set to the detection mode, the level of the signal output from the first light receiving element 131 in the first period is located at the center of the input range allowed in the position detection section 50 in the state in which the target object Ob does not exist as shown in FIG. 13A. Therefore, when performing the first period in the state in which the target object Ob exists, the adjustment range of the value of the drive current to be supplied to the first light source 121 is wide, and therefore the detection range can be prevented from being limited. The same is applied to the second period in the period T2 in which the second light receiving element 132 is set to the detection mode.

Therefore, according to the present embodiment, since there is no need to expand the input range of the position detection section 50, the position detection section 50 can detect the position of the target object Ob with high resolution.

OTHER EMBODIMENTS

Although in the embodiments described above two light source sections (the first light source section 12A and the second light source section 12B) are used, it is also possible to detect the position of the target object Ob using a single light source section 12. Further, although in the embodiments described above the light receiving section 13 is disposed at the radiation center position of the detection light L2, it is also possible to dispose the light receiving section 13 in other places, or to dispose the light receiving section 13 common to the two light source sections (the first light source section 12A and the second light source section 12B). Further, although in the embodiments described above the light receiving section 13 is provided with two light receiving elements (the first light receiving element 131 and the second light receiving element 132), it is also possible for the light receiving section 13 to be provided with three or more light receiving elements.

It should be noted that although in the embodiments described above the light source 120 is provided to each of the two light guides LG, it is also possible to dispose the light sources 120 on the both ends of a single light guide LG, and alternately light the light sources 120 to thereby form the light intensity distributions in the directions opposite to each other respectively in the first period and the second period. In this case, if the light receiving section 13 is disposed at the radiation center of the light source section 12, it results that the entrance of the detection light L2 to the light receiving section 13 is hindered by the light source section 12, and therefore, the light receiving section 13 can be disposed at the position shifted in the Z-axis direction from the radiation center of the light source section 12.

Further, although in the embodiments described above the first light source module 126 and the second light source module 127 emit the detection light L2 provided with the light intensity distribution in which the intensity varies in a direction from one side to the other side in the emission range using the light guide LG, it is also possible to adopt the configuration of having a plurality of light emitting elements as the first light source module 126 and the second light source module 127, reducing the drive current to each of the light emitting elements from one located at one end in the array direction thereof to one located at the other end by the light source drive section 51 to thereby emit the detection light L2 having the light intensity distribution in which the intensity varies from one side toward the other side in the emission range.

Configuration Example of Position Detection System

First Specific Example of Position Detection System

Figure 14:
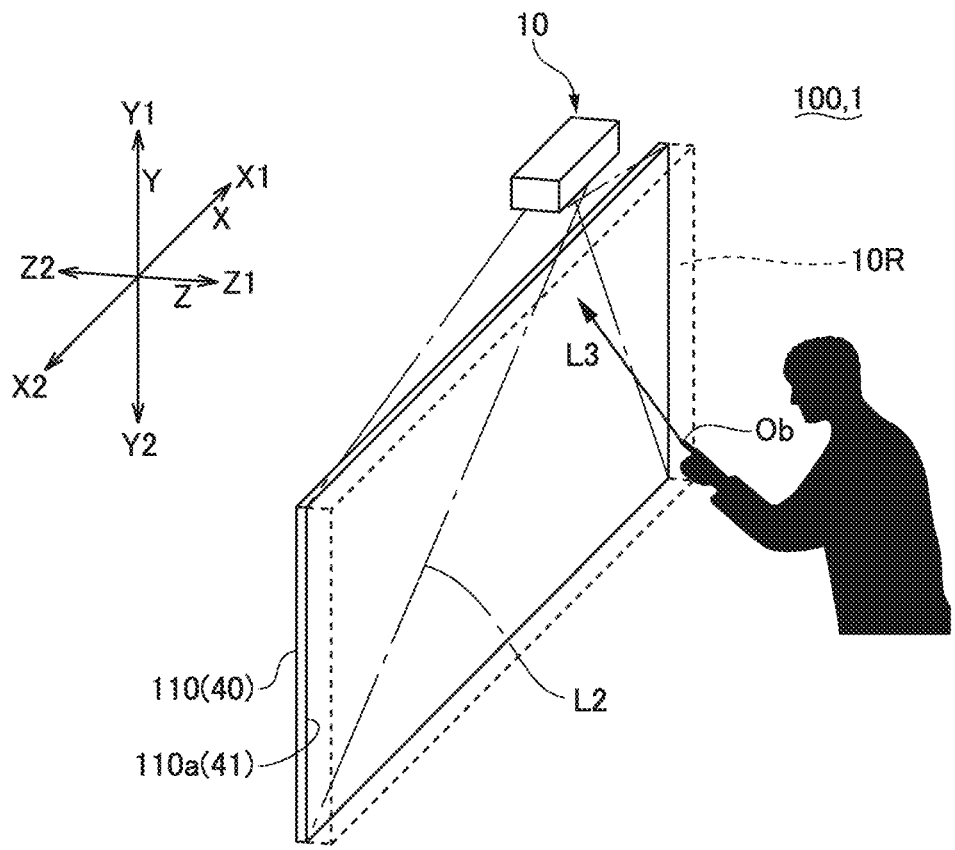
FIG. 14 is an explanatory diagram of a first specific example (a display system with an input function) of a position detection system to which the embodiment of the invention is applied.

FIG. 14 is an explanatory diagram of a first specific example (a display system with an input function) of a position detection system 1 to which the embodiment of the invention is applied. It should be noted that in the display system with the input function according to the present embodiment, since the configuration of the position detection system 1 and the optical position detection device 10 is substantially the same as the configuration explained with reference to FIGS. 1A, 1B, 2, 3, 4A, 4B, 5A, 5B, 6A, 6B, 7A, 7B, 8, 9A through 9D, 10, 11A through 11C, 12A, 12B, 13A, and 13B, the constituents common to the both configurations are denoted with the same reference symbols, and the explanation therefor will be omitted.

As shown in FIG. 14, in the position detection system 1 according to the present embodiment, by using the image display device 110 as the visual plane forming member 40, and disposing the optical position detection device 10 explained with reference to FIGS. 1A, 1B, 2, 3, 4A, 4B, 5A, 5B, 6A, 6B, 7A, 7B, 8, 9A through 9D, 10, 11A through 11C, 12A, 12B, 13A, and 13B to the image display device 110, it can be used as the display system 100 with the input function such as a blackboard or a digital signage. Here, the image display device 110 is a direct-view image display device or a rear-projection image display device using the visual plane forming member 40 as a screen.

In such a display system 100 with the input function, the optical position detection device 10 emits the detection light L2 along the display surface 110a (the visual plane 41) of the image display device 110, and at the same time, detects the detection light L2 (the reflected light L3) reflected by the target object Ob. Therefore, if the target object Ob is moved closer to a part of the image displayed by the image display device 110, the position of the target object Ob can be detected, and therefore, the position of the target object Ob can be used as the input information such as a switching instruction of the image.

Second Specific Example of Position Detection System

An example using a screen as the visual plane forming member 40 to thereby constitute the projection display system with an input function will be explained with reference to FIG. 15. FIG. 15 is an explanatory diagram of a second specific example (a display system with an input function or a projection display system with an input function) of the position detection system 1 to which the embodiment of the invention is applied. It should be noted that in the projection display system with the input function according to the present embodiment, since the configuration of the position detection system 1 and the optical position detection device 10 is substantially the same as the configuration explained with reference to FIGS. 1A, 1B, 2, 3, 4A, 4B, 5A, 5B, 6A, 6B, 7A, 7B, 8, 9A through 9D, 10, 11A through 11C, 12A, 12B, 13A, and 13B, the constituents common to the both configurations are denoted with the same reference symbols, and the explanation therefor will be omitted.

In the projection display system 200 (the display system with the input function) with the input function shown in FIG. 15, the image is projected on the screen 80 (the visual plane forming member 40) from an image projection device 250 (an image reproduction device) called a liquid crystal projector or a digital micromirror Device™. In such a projection display system 200 with the input function, the image projection device 250 projects the image display light Pi in an enlarged manner from a projection lens system 210 provided to a housing 240 toward the screen 80. Here, the image projection device 250 projects the image display light Pi toward the screen 80 in a direction slightly tilted with respect to the Y-axis direction. Therefore, the visual plane 41 where the information is viewed is formed by the screen surface 80a on which the image is projected in the screen 80.

In such a projection display system 200 with the input function, the optical position detection device 10 is attached to the image projection device 250, and is formed integrally therewith. Therefore, the optical position detection device 10 emits the detection light L2 along the screen surface 80a from a place different from the projection lens system 210, and at the same time, detects the reflected light L3 reflected by the target object Ob. Therefore, if the target object Ob is moved closer to a part of the image projected on the screen 80, the position of the target object Ob can be detected, and therefore, the position of the target object Ob can be used as the input information such as a switching instruction of the image.

It should be noted that by integrating the optical position detection device 10 and the screen 80 with each other, a screen device with an input function can be formed.

Other Specific Examples of Position Detection System

In the invention, a configuration of using a light transmissive member covering an exhibit as the visual plane forming member 40 can be adopted, and in this case, the visual plane 41 is the side in the light transmissive member opposite to the side on which the exhibit is disposed and the side from which the exhibit is viewed. According to such a configuration, it can be configured as a window system with the input function or the like.

Further, the configuration of using a substrate for supporting a moving gaming medium as the visual plane forming member 40 can be adopted, and in this case, the visual plane 41 is the side of the substrate from which the relative position between the substrate and the gaming medium can be viewed. According to such a configuration, it is possible to configure amusement equipment such as a pinball machine or a coin game as an amusement system with an input function or the like.

The entire disclosure of Japanese Patent Application No. 2011-145370, filed Jun. 30, 2011 is expressly incorporated by reference herein.

What is claimed is:

1. An optical position detection device comprising:
a light source device adapted to emit detection light, and to vary emission intensity of the detection light from one side of a space where the detection light is emitted toward the other side when emitting the detection light;
a light receiving section adapted to receive the detection light reflected in the space; and
a position detection section adapted to detect a position of a target object in the space based on a detecting signal output from the light receiving section,
wherein the light receiving section includes a first light receiving element having a light receiving surface pointed at the one side of the space and a second light receiving element having a light receiving surface pointed at the other side of the space at a position adjacent to the first light receiving element,
an intersection angle between a normal direction with respect to the light receiving surface of the first light receiving element and a normal direction with respect to the light receiving surface of the second light receiving element is larger than 90° and smaller than 180°,
the light source device reduces the emission intensity from the one side of the space toward the other side in a first period, and reduces the emission intensity from the other side of the space toward the one side in a second period having no overlap with the first period,
the position detection section detects the position of the target object based on a drive current value in the light source device when a level of the detecting signal in the first period and a level of the detecting signal in the second period become equal to each other,
the position detection section varies the drive current value in the first period and the drive current value in the second period based on a result of comparison between a level of the detecting signal in the first period and a level of the detecting signal in the second period when the light source device emits the detection light using a reference drive current value in the first period and the second period, and
when the level of the detecting signal in the first period and the level of the detecting signal in the second period become equal to each other, the position of the target object is detected based on a comparison result between an adjustment amount of the drive current value in the first period from the reference drive current value and an adjustment amount of the drive current value in the second period from the reference drive current value.

2. The optical position detection device according to claim 1, wherein
the intersection angle is larger than 120° and smaller than 140°.

3. The optical position detection device according to claim 1, wherein
the first light receiving element and the second light receiving element simultaneously detect the detection light reflected in the space.

4. The optical position detection device according to claim 1, wherein
the first light receiving element and the second light receiving element detect the detection light reflected in the space in respective periods different from each other.

5. The optical position detection device according to claim 4, wherein
the light source device sets the reference drive current value in the first period to be lower than the reference drive current value in the second period in a period in which the first light receiving element performs the detection, and sets the reference drive current value in the second period to be lower than the reference drive current value in the first period in a period in which the second light receiving element performs the detection.

6. The optical position detection device according to claim 5, wherein
the light source device includes
a first light source adapted to emit the detection light in the first period,
a first amplification section adapted to amplify a current to be supplied to the first light source,
a second light source adapted to emit the detection light in the second period, and
a second amplification section adapted to amplify a current to be supplied to the second light source.

7. A display system with an input function comprising:
the optical position detection device according to claim 1; and
a display device provided with a display surface where an image is displayed,
wherein the display device switches the image based on the position of the target object in a direction along the display surface detected by the optical position detection device.

8. A display system with an input function comprising:
the optical position detection device according to claim 2; and
a display device provided with a display surface where an image is displayed,
wherein the display device switches the image based on the position of the target object in a direction along the display surface detected by the optical position detection device.

9. A display system with an input function comprising:
the optical position detection device according to claim 3; and
a display device provided with a display surface where an image is displayed,
wherein the display device switches the image based on the position of the target object in a direction along the display surface detected by the optical position detection device.

10. A display system with an input function comprising:
the optical position detection device according to claim 4; and
a display device provided with a display surface where an image is displayed,
wherein the display device switches the image based on the position of the target object in a direction along the display surface detected by the optical position detection device.

11. A display system with an input function comprising:
the optical position detection device according to claim 1; and
an image projection device adapted to project an image,
wherein the image projection device switches the image based on the position of the target object in a direction traversing a projection direction of the image detected by the optical position detection device.

12. A display system with an input function comprising:
   the optical position detection device according to claim 2; and
   an image projection device adapted to project an image,
   wherein the image projection device switches the image based on the position of the target object in a direction traversing a projection direction of the image detected by the optical position detection device.

13. A display system with an input function comprising:
   the optical position detection device according to claim 3; and
   an image projection device adapted to project an image,
   wherein the image projection device switches the image based on the position of the target object in a direction traversing a projection direction of the image detected by the optical position detection device.

14. A display system with an input function comprising:
   the optical position detection device according to claim 4; and
   an image projection device adapted to project an image,
   wherein the image projection device switches the image based on the position of the target object in a direction traversing a projection direction of the image detected by the optical position detection device.

\* \* \* \* \*